April 11, 1939.   J. R. GREEN ET AL   2,153,922
CONTROL METHOD AND APPARATUS
Filed Feb. 4, 1935   7 Sheets-Sheet 1

INVENTOR.
JOHN R. GREEN
ANKER E. KROGH
COLEMAN B. MOORE
ROY ULLMAN
BY John E. Hubbell
ATTORNEY

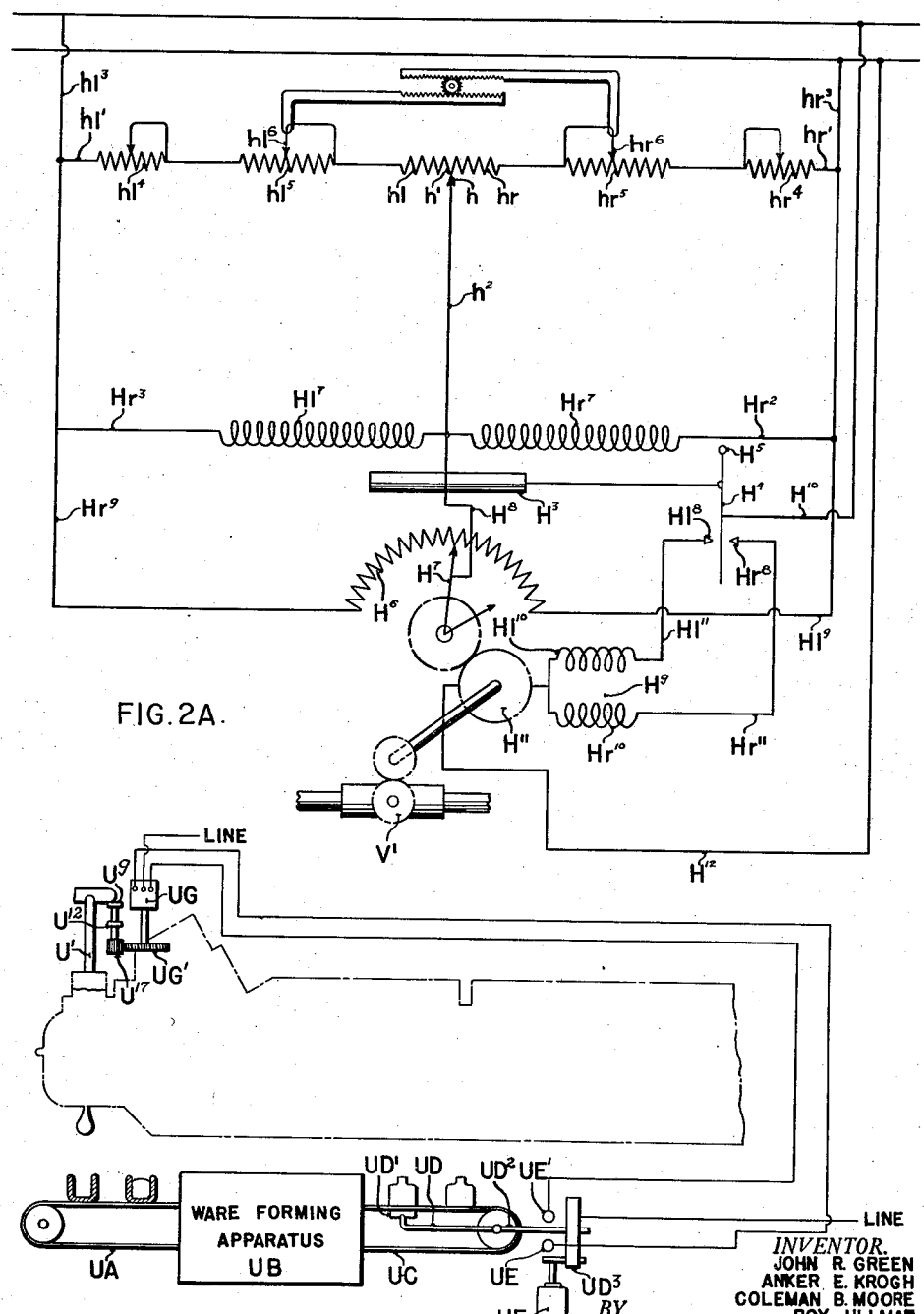

April 11, 1939.  J. R. GREEN ET AL  2,153,922

CONTROL METHOD AND APPARATUS

Filed Feb. 4, 1935  7 Sheets-Sheet 3

INVENTOR.
JOHN R. GREEN
ANKER E. KROEH
COLEMAN B. MOORE
ROY ULLMAN

BY John E. Hubbell
ATTORNEY.

April 11, 1939.　　　J. R. GREEN ET AL　　　2,153,922
CONTROL METHOD AND APPARATUS
Filed Feb. 4, 1935　　　7 Sheets-Sheet 4
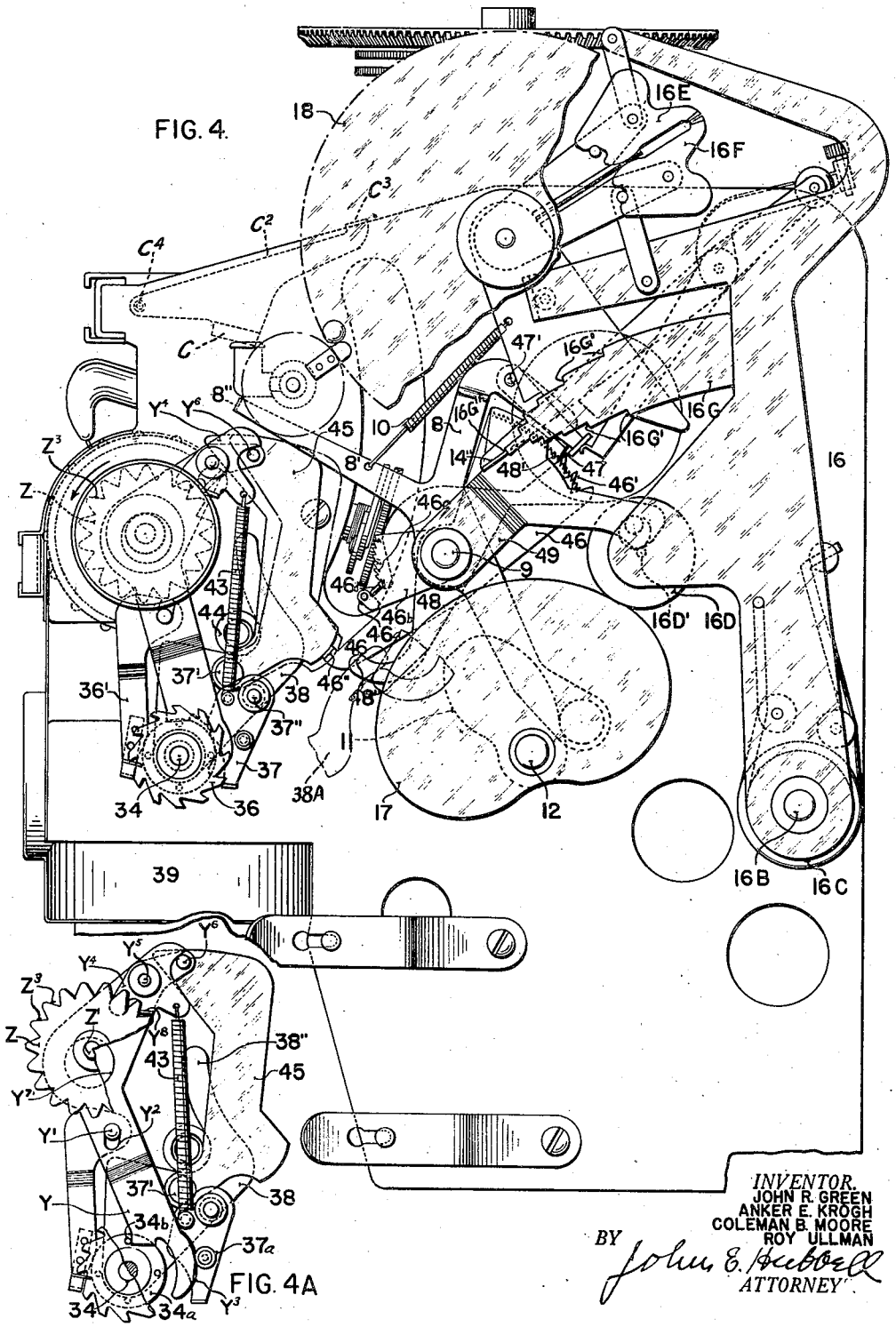
INVENTOR.
JOHN R. GREEN
ANKER E. KROGH
COLEMAN B. MOORE
ROY ULLMAN
BY John E. Hubbell
ATTORNEY

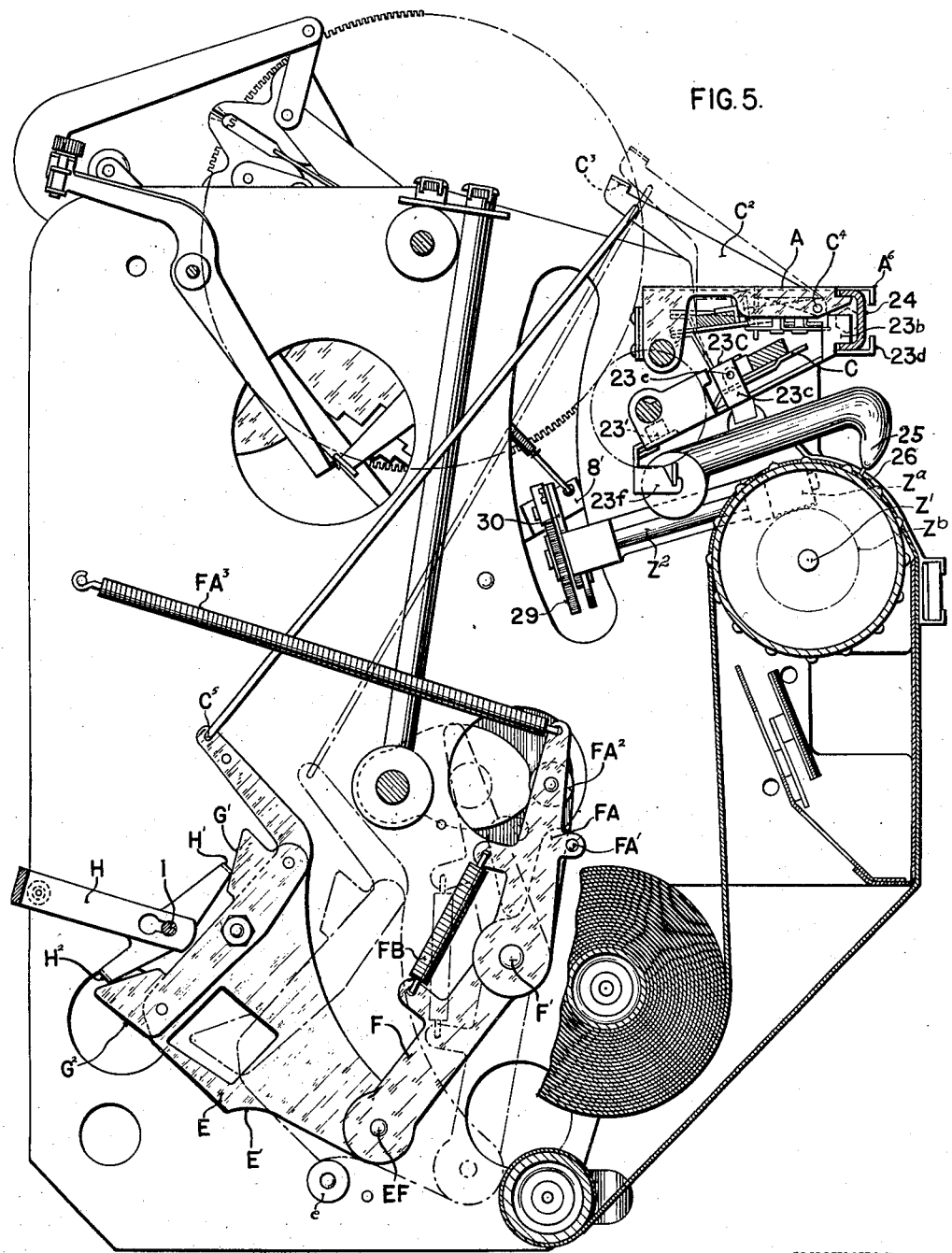

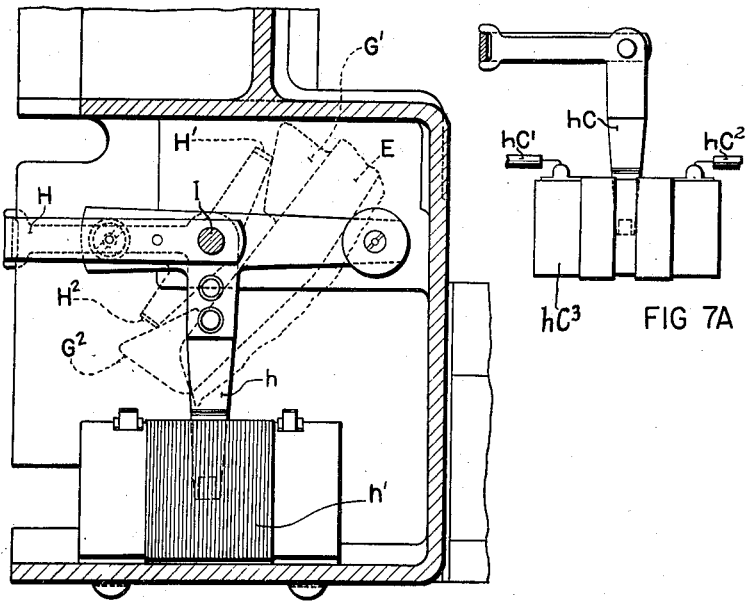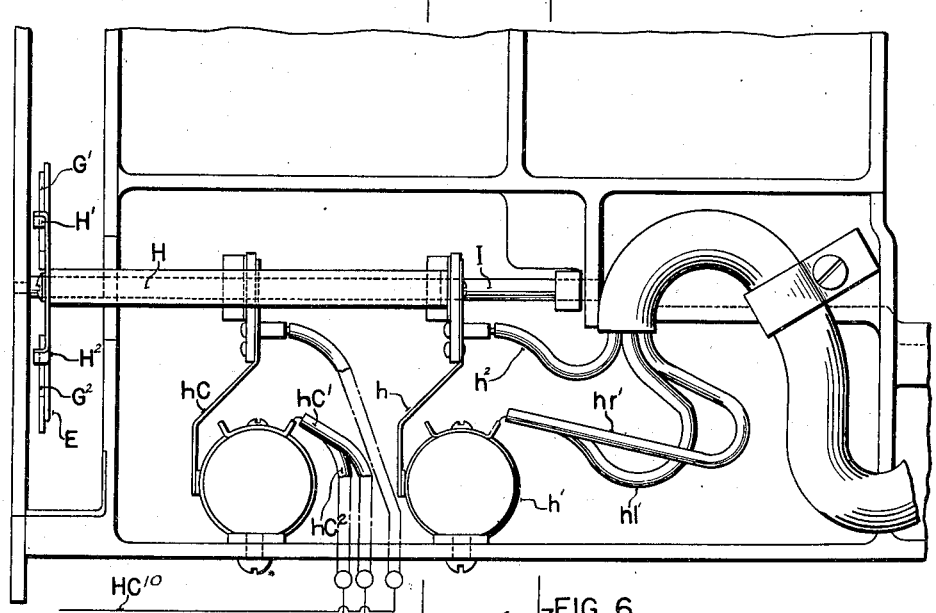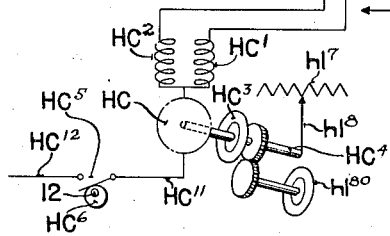

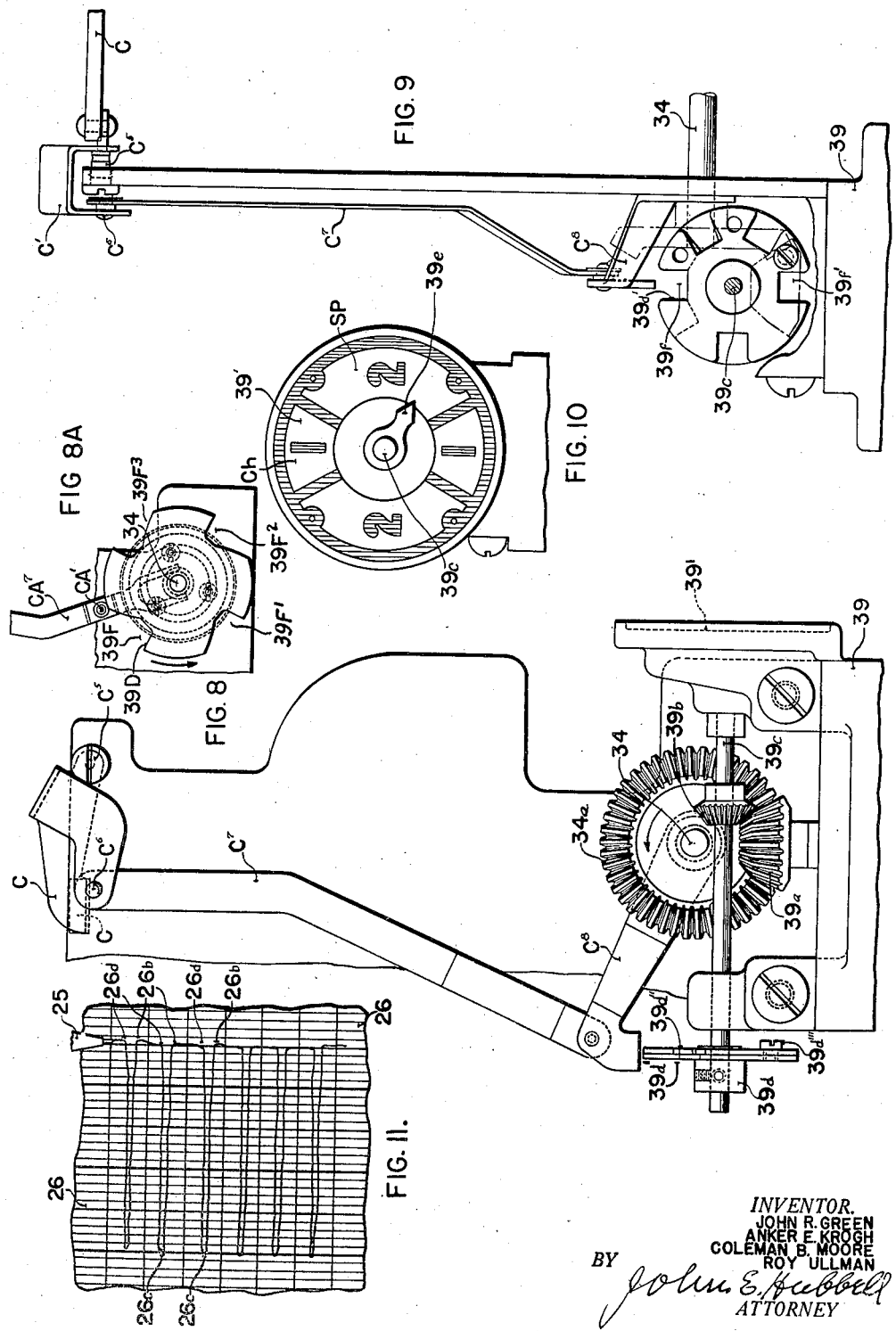

UNITED STATES PATENT OFFICE 2,153,922

CONTROL METHOD AND APPARATUS

John R. Green, Philadelphia, Anker E. Krogh, Erdenheim, Coleman B. Moore, Carroll Park, and Roy Ullman, Roslyn, Pa., assignors to The Brown Instrument Company, Philadelphia, Pa., a corporation of Pennsylvania Application February 4, 1935, Serial No. 4,738

5 Claims. (Cl. 49—55)

In the manufacture of bottles and other glass articles by means of modern automatic glass ware machinery, the character and value of the product is directly dependent, as a general proposition, upon the production and delivery to the machinery of glass gobs, or masses of the proper weight and viscosity. In a glass feeder of approved type for use with which the present invention is well adapted, the glass gobs are segregated and delivered from a glass feeder comprising a receptacle into which molten glass is delivered and to which heat is supplied by regulable heating means to maintain and regulate the temperature of the molten glass therein and from which the glass is discharged in a stream from which the gobs are segregated by a periodically operating clipper or shearing device which forms a gob by cutting off a section of the glass stream discharged.

In the most usual form of such a glass feeder, the glass forming the stream from which the gobs are severed is intermittently expelled or extruded through a discharge orifice in the bottom wall of the receptacle by a reciprocating plunger moving axially of the orifice. With glass of a given composition and temperature and with the glass extruding plunger making strokes of uniform length at a constant frequency, and with a corresponding frequency of operation of the glass stream severing means, the glass gobs separated should and will be of uniform weight and viscosity with glass of a given composition and temperature. In practice, however, it has been found impossible to maintain a constant glass discharge temperature and only a relatively small variation in glass temperature is required to produce a change in glass viscosity sufficient to materially effect the weight of the gobs of glass severed, since the rate of discharge depends not only on the measuring action of the extruding plunger, but on the gravitational flow of the glass, and that flow is a function of the glass viscosity.

Slight changes in glass gob weight are prohibitive in many cases. For example, in the manufacture of bottles for expensive perfumery, a very slight change in the glass gob weight will result in a variation in bottle capacity which will not be tolerated by the perfumery bottler or distributor. Insofar as the glass gob weight is concerned, compensation for changes in glass viscosity through a considerable range can be effected by varying the stroke of the extruding plunger, provided that the necessity for the adjustment and the extent of adjustment required is made apparent with suitable promptness and accuracy.

In general also the operation of the glass ware machinery can be adjusted to compensate for a considerable variation in glass viscosity, if the need for such adjustment is made apparent with suitable promptness and accuracy.

It would seem to be comparatively simple to provide for automatic glass temperature measurements, and a control of the glass feeder heating provisions in automatic response to said measurements, effective to maintain an approximately constant glass discharge temperature, and to keep the maximum glass temperature and viscosity variations from predetermined normals suitably small. In practice, however, temperature control apparatus of the type just mentioned devised for and successfully employed in effecting control operations in other arts, has been found unsatisfactory in the control of glass feeders, primarily, it is believed, because they necessarily involve and permit relatively rapid though small fluctuations in the temperature and viscosity of the glass discharged, which cannot be suitably compensated for, either through the regulation of the plunger stroke to maintain an approximately constant glass gob weight, or by the adjustment of the article forming machinery to compensate for variations in glass viscosity.

In controlling the operation of a glass feeder of the general type mentioned above, we have found that better results are obtainable with a control which, while it may permit of an appreciable variation in that temperature, insures a slower and more gradual rate of temperature change in either direction, than is obtainable with the smaller range of temperature variations but more rapid fluctuations in glass temperature, characteristic of control effected by temperature measuring and control provisions of the character heretofore developed and found satisfactory for controlling the operation of oil heating and other industrial furnaces. Our invention, therefore, has for a general object, the provision of a control method and apparatus which, while they may permit an appreciable variation in glass temperature, will keep those variations within a range not great enough to be seriously objectionable, and will avoid an objectionably rapid fluctuation in the discharge temperature at any time. A more specific object of the invention is to provide apparatus constantly furnishing an accurate measure and record of the essential glass temperature conditions forming a guide for the manual adjustments of the feeder heating supply and the operation of the plunger, and providing an automatic control of the heat supplied to the feeder adjacent the feeder discharge orifice, effective to hold the discharge temperature within suitable limits, without causing undesirably abrupt variations therein.

In a preferred mode of carrying out the present invention, we make use of a single measuring and control instrument and associated means for measuring the temperature of the glass in the feeder adjacent the discharge orifice and the temperature of the glass in a portion of the feeder relatively remote from the discharge orifice, at alternate intervals, with provisions controlled thereby for increasing and decreasing the supply of heat to the portion of the glass in the feeder adjacent the discharge orifice at a rate sufficiently rapid to slow down and equalize changes in glass discharge temperature which result from such causes as an improper adjustment of the means employed to supply heat to the main body of glass in the feeder, and changes in the temperature at which the molten glass is supplied to the feeder.

With timely and accurate knowledge of the values of and changes in the two above mentioned glass temperatures, it is possible to adjust the feeding plunger stroke, or some other adjustable glass feeder element, as required for the delivery of gobs suitably uniform in weight, notwithstanding changes in glass viscosity, and to effect the glass ware machinery adjustment required to compensate for the changes in glass feeding conditions.

The temperature measuring and control instrument employed may obviously take various forms, and in particular may be similar in general construction and mode of operation to measuring and control instruments of various types now in use for other purposes. In practice, we have obtained excellent results with, and prefer to make use of a self balancing potentiometer measuring and control instrument of the character disclosed in the Harrison patent, 1,946,280, granted February 6, 1934, and our invention comprises modifications in and additions to the instrument disclosed in said patent giving the instrument operating characteristics especially desirable for glass feeder measurement and control purposes, but useful for other purposes also. An especially desirable characteristic of our improved instrument is its capacity for making each control action dependent upon an accurate measure of one or two alternately measured temperatures. This is peculiarly important in the case of a self balancing potentiometer employed to alternately measure temperatures which differ from one another as do the temperatures of the glass in the feeder at points relatively adjacent to and remote from the feeder outlet orifice. In the alternate measurement of such dissimilar temperatures by a self balancing potentiometer, the number of balancing operations following a measurement of one temperature, required to obtain an accurate measurement of the other temperature, will vary, but should be kept as small as possible, since an increase in the number of balancing operations prolongs the periods between successive control operations, which is undesirable.

The general features of the present invention are as applicable to a glass feeder of the type in which the fluid pressure to which the glass at the inlet of the discharge orifice is periodically varied to effect a periodical discharge through the orifice, as to the type of glass feeder, hereinbefore mentioned, in which a reciprocating extrusion plunger is employed.

Our invention contemplates a direct measure of the gob weight either before or after the conversion of the gob into a bottle or other article made in the glassware machine and the use of the weight measurement as a guide for manual, or automatic control of the adjustment of the feeder plunger.

The various features of novelty which characterize our invention are pointed out with particularity in the claims annexed to and forming a part of this specification. For a better understanding of the invention, however, its advantages and specific objects obtained with its use, reference should be had to the accompanying drawings and descriptive matter in which we have illustrated and described preferred forms of apparatus for use in the practice of the present invention.

Of the drawings:

Fig. 2A is a diagram illustrating a modification of the control circuit shown in Fig. 2 adapted for use in adjusting a motor actuated control valve which may replace the thermally actuated control valve shown in Fig. 1;

Fig. 2B is a diagrammatic representation of means employed to adjust the glass feeder in automatic response to changes in glass gob weight.

Fig. 4 is an elevation of the end of the instrument partially shown in Fig. 3, which is at the right in Fig. 3;

Fig. 4A is an elevation, taken similarly to Fig. 4, showing parts of the instrument obscured in Fig. 4 by parts removed in Fig. 4A;

Fig. 5 is an elevation of the control instrument as seen from the left of Fig. 3, with parts broken away and in section;

Fig. 6 is a rear elevation of a portion of the instrument shown in Fig. 3;

Fig. 7 is a section on the line 7—7 of Fig. 6;

Fig. 7A is a partial section on the line 7A—7A of Fig. 6;

Fig. 8 is an elevation illustrating a detail of the instrument shown in Fig. 3;

Fig. 8A is an elevation illustrating a modification of Fig. 8;

Fig. 9 is an elevation of the apparatus shown in Fig. 8 with parts broken away and in section, as seen from the right of that figure;

Fig. 10 is an elevation of a portion of the apparatus shown in Fig. 8 as seen from the right of that figure; and Fig. 11 is a view showing a portion of a record sheet shown in Fig. 3 with the record lines formed thereon by the instrument.

Figure 1:
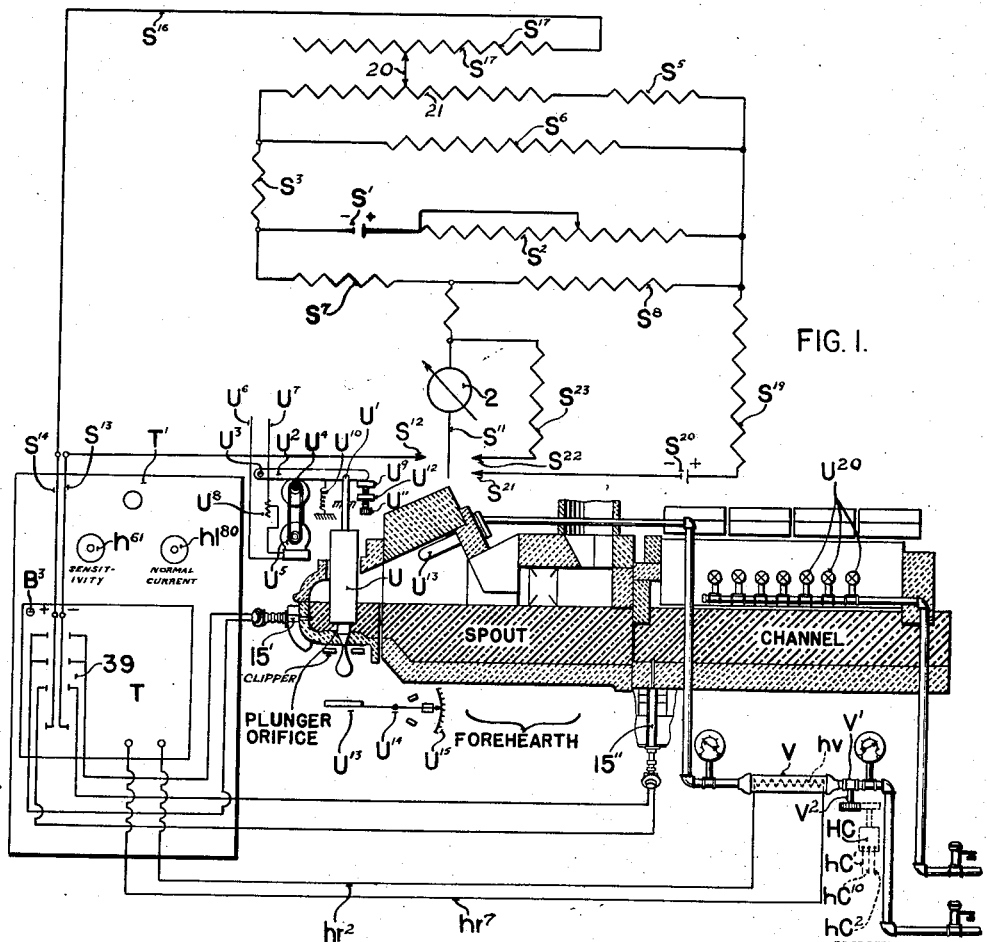
Fig. 1 is a diagram illustrating a glass feeder mechanism and certain control and temperature measuring features associated therewith.

In Fig. 1, we illustrate the use of our invention in connection with a glass feeder of known type adapted to deliver gobs of glass for use in bottle forming machinery not shown. The feeder comprises a glass receptacle structure, which is commonly referred to as a forehearth, and comprises two portions, one commonly called the channel and the other the spout. Molten glass is supplied to the channel portion of the feeder receptacle from a tank, not shown, and flows from the channel into the spout. The latter is provided with a submerged discharge orifice in its bottom wall in line with a vertically reciprocating plunger U which moves upward to open the orifice, and on each down stroke extrudes through the orifice a quantity of glass equivalent in amount to an individual gob, and at the conclusion of its down stroke, substantially closes the orifice. Clipper shears beneath the orifice and operating in timed relation with the plunger movements, periodically cut off the lower portion of the stream or attenuating body of glass depending from the orifice, to thereby form a glass gob for conveyance by suitable mechanism (not shown) to the bottle forming machinery.

The glass extruding plunger U, as shown, has a stem pivotally connected at U' to a plunger operating lever $U^2$ which is oscillated about its pivot $U^3$ by an eccentric $U^4$. The latter is continuously rotated about a stationary axis by an electromotor $U^5$, one of the energizing conductors, $U^6$ and $U^7$, of which includes a resistance $U^8$ which may be varied to vary the speed of the motor. The vertical movements given the lever $U^2$ by the cam $U^4$ have a fixed upper limit, but their lower limits are adjustable and are determined by the engagement of the lever with a stop $U^9$ carried by a vertical screw $U^{11}$ threaded through a fixed support $U^{12}$. The elevation of the stop $U^9$, and thereby the length of the stroke of the extruding plunger, may be adjusted by a rotation of the screw $U^{11}$ which may be effected automatically when desirable, but, as shown, is effected manually. With glass of a given viscosity, the amount of glass expelled on each plunger downstroke, and the size of the gob severed by the clipper, will depend on the length of the stroke of the plunger.

While the glass delivered to the forehearth from the tank is always molten, it is not practically feasible to maintain a feeder discharge which is high enough and constant enough by regulating the tank glass temperature, and the feeder is supplied with glass heating means. In the arrangement shown in Fig. 1, the heat supply means comprises manually adjustable fuel burners $U^{20}$ for supplying heat to the glass in the channel portion of the forehearth, and an automatically adjusted burner $U^{13}$ for supplying heat to the glass in the portion of the spout adjacent the discharge orifice.

In the preferred mode of use of the apparatus shown in Fig. 1, the burners $U^{20}$ are adjusted as required to supply a considerable portion of the feeder heat requirement but are not relied upon to maintain a constant channel glass temperature or to prevent that temperature from being substantially lower, ordinarily 100° or so lower than the desired glass temperature, and the burner $U^{13}$ is adjusted as required to raise the temperature of the glass adjacent the discharge orifice and prevent that temperature from departing more than a few degrees from a predetermined normal temperature and at the same time preventing change in that temperature, except at a rate so slow that ample time will be provided to determine the need for, and to effect the adjustments of the stop $U^{11}$ necessary to keep the individual glass gobs delivered practically uniform in weight, and the adjustments of the bottle machinery necessary to compensate therein for the effect of changes in glass viscosity resulting from the changes in glass gob temperature. The desired glass temperature regulation requires suitable glass temperature measurements and, preferably, records of the measurements. In the apparatus shown, the temperature of the glass in the spout adjacent the orifice is measured by means including a thermocouple $15'$ extending through the spout wall with its tip in contact with the glass. The tip may be covered by a protecting tube or may be bare so as to be more quickly responsive to changes in temperature of the molten glass. A thermocouple $15''$, which may be similar to the thermocouple $15'$, extends into contact with the glass in the channel. With the apparatus disclosed, the temperatures to which the two thermocouples are exposed are separately measured and are suitably recorded. In effecting adjustments of the extruding plunger strokes, and of the bottle making machinery, account should be taken not only of the spout temperature but of the subsequent effect on that temperature of the channel glass temperature. With the form of apparatus disclosed, the temperature measurements made by the use of the thermocouple $15''$ may be taken into account in adjusting the burners $U^{20}$, but the burner $U^{13}$ is adjusted automatically in response to the measurements of the temperature to which the thermocouple $15'$ responds.

In the diagrammatic showing of Fig. 1, T represents the casing of a measuring, recording and control instrument mounted on a panel T' and to which the terminals of the thermocouples $15'$ and $15''$ are connected, and which includes the circuit parts shown in Fig. 1. The instrument enclosed by the casing T, includes a switch 39 shown in detail in Figs. 8-10, which operatively connects the thermocouples $15'$ and $15''$ alternately to the instrument and during a portion of the time in which the thermocouple $15'$ is operatively connected to the instrument, the latter subjects the thermally actuated valve V, regulating the supply of fuel to the burner $U^{13}$, to control effects dependent upon the then existing temperature of the thermocouple $15'$.

The instrument enclosed by the casing T of Fig. 1, and the hereinafter described mechanical features, of which are shown by Figs. 3 to 8, is a self-balancing potentiometer instrument including a potentiometer measuring circuit which as shown diagrammatically in Fig. 1, is of conventional split potentiometer type. The potentiometer circuit of Fig. 1 includes a battery or other source of energizing current S' in series with a calibrating resistance $S^2$ in a circuit branch to the ends of which are connected three other circuit branches. One of the latter includes a slide-wire resistance 21 and a ballast resistance $S^5$. The second of said three branch circuits includes a calibrating resistance which determines the measuring range of the potentiometer circuit, and the third includes ballast resistances $S^7$ and $S^8$. The circuit branches including the slide-wire resistance 21 and the resistance $S^6$ are each connected at one end to one end of the branch including the battery S' through a ballast resistance $S^3$. A galvanometer 2 has one terminal connected to the circuit branch including the resistances $S^7$ and $S^8$ intermediate of the latter, and has its other terminal connected to a switch part $S^{11}$ which in the measuring condition of the apparatus engages a contact $S^{12}$ connected by a conductor to the potentiometer circuit terminal $S^{13}$ of the switch 39. The cooperating potentiometer circuit terminal $S^{14}$ is connected by a conductor $S^{16}$ to one end of a slide wire resistance $S^{17}$ alongside the slidewire resistance 21 and connected to the latter by a bridging contact 20. The latter is movable along the slidewire resistances to vary the point along the length of the resistance 21 at which the terminal $S^{14}$ is connected to the latter, and to correspondingly vary the amount of the resistance $S^{17}$ in circuit for the known purpose of preserving an approximately constant resistance in the galvanometer circuit.

If with the switch 39 adjusted to connect the terminals $S^{13}$ and $S^{14}$ to the terminals of one or the other of the thermocouples 15' and 15'', the voltage of the thermocouple so connected to the potentiometer circuit is equal and opposite to the potential difference between the portion of the slide-wire resistance 21 then engaged by the contact 20 and the terminal of the galvanometer connected to the circuit branch including resistances $S^7$ and $S^8$, the potentiometer will be in balance, but not otherwise. When not in balance, the resultant deflection of the galvanometer pointer 2' will set into operation the instrument rebalancing mechanism to thereby automatically adjust the contact 20 along the slide-wire resistance 21 until the potential difference between the points of the potentiometer circuit to which the thermocouple is connected is equal and opposite to the thermocouple, and the potentiometer is thereby balanced.

As those skilled in the art will understand, the resistance $S^7$ may be of such value and have such a temperature coefficient as to compensate for variations in the thermocouple cold junction temperature. Fig. 1 conventionally illustrates calibrating provisions including a resistance $S^{19}$, a standard cell $S^{20}$, a shunt resistance $S^{23}$ and switch contacts $S^{21}$ and $S^{22}$ into engagement with which the switch part $S^{11}$ may be moved to determine the changes in the amount of the resistance $S^2$ in circuit required to compensate for changes in voltage of the energizing source $S'$. As the need for and mode of effecting such recalibration of the energizing circuit from time to time are well known, they need not be further referred to herein.

In respect to most of its potentiometer recording features, the instrument shown herein is similar in form, as well as in substance, to the instrument disclosed in the joint application of Harrison, Grauel and Kessler, Serial No. 546,290, filed June 23, 1931, and in respect to a number of its control features, the instrument shown herein is similar to the instrument disclosed in the above mentioned Harrison patent. The manner in which we make use of the features of said application and patent, and combine them with other control features, for the purposes of the present invention, is set forth in the following description of the construction and operation of the instrument disclosed herein.

The mechanical relay mechanism of the instrument shown which includes a driving shaft 12, constantly rotated by a driving motor, not shown, is controlled by the deflection of the galvanometer pointer 2' away from its normal zero position. They serve not only to periodically adjust the contact 20 as required to rebalance the potentiometer circuit, but also to move a pen or other recorder carriage 23 along a travelling record strip 26 to record the varying value of the quantity measured on said strip. The means for effecting control functions include a control table A, and means by which a control member, which in the form shown in Fig. 1, is a valve V controlling the supply of fuel to the burner $U^{13}$, is periodically adjusted by the relay mechanism, if and when the recorder carriage 23 is then displaced in one direction or the other from the control table A. The latter is normally stationary but may be manually adjusted along the path of movement of the carriage 23 as by the rotation of the knob $B^3$ shown in Fig. 1 and any suitable connection between said knob and table. The position of the control table A corresponds to, and determines the normal value, and the position of the carriage 23 corresponds to, and measures the current value of the quantity measured.

The mechanism through which the deflection of the galvanometer pointer 2' controls the adjustments of the recorder carriage 23 and the rebalancing of the potentiometer circuit on a variation in the quantity or value measured by the galvanometer, comprises a pointer engaging and position gauge element 3. The latter is pivotally supported and in connection with the hereinafter mentioned shaft 6 has a loading tendency, which may well be due partly to spring and partly to gravitational action, to turn upward into the position in which one or another of the shoulders 5 of the member 3 engage the pointer 2'. The element is engaged by, and turns, with the arm 6' of a rock shaft 6. A spring 10 tends to hold a rocker 8 which is journaled on a pivot 9, in the position in which the rocker engages an arm 7 secured to the shaft 6 and thereby holds the latter in a position in which the shoulders 5 are all below the pointer 2'.

Figure 3:
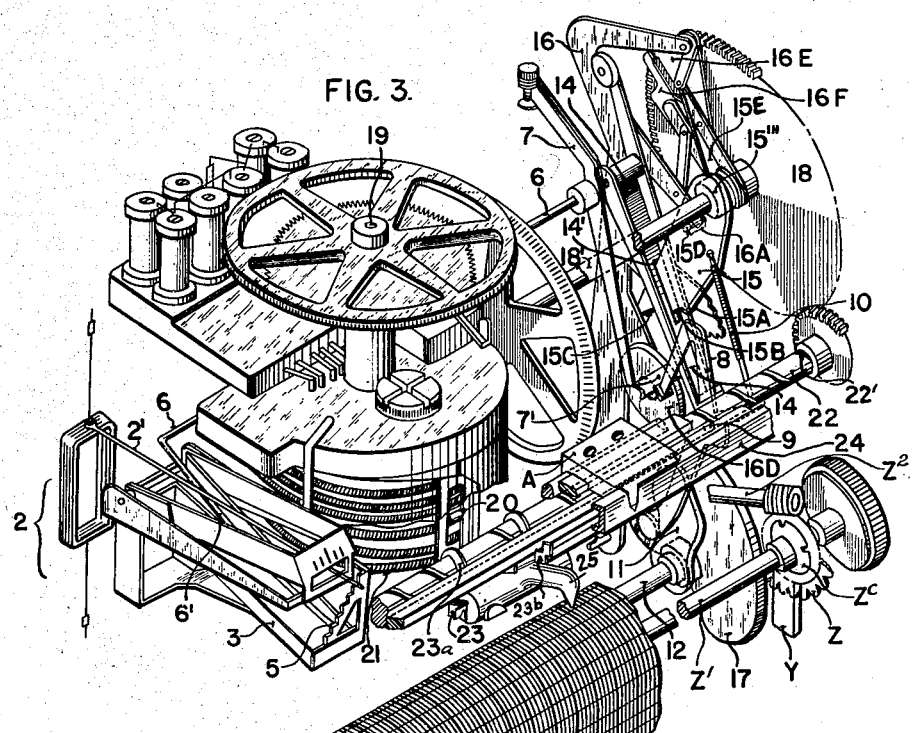
Fig. 3 is a perspective view of parts of a potentiometer measuring and control instrument diagrammatically shown in Fig. 1.

A cam 11 which is carried by shaft 12 constantly rotated by the instrument driving motor through a speed reduction gearing, turns the rocker 8 about its pivot against the action of the spring 10, once during each revolution. This allows the arm 7 to turn counter-clockwise, as seen in Fig. 3, until the corresponding angular movement of the shaft 6 is interrupted by the engagement of one or another of the shoulders 5 of the member 3 with the galvanometer pointer 2'. The shoulders 5 are so arranged that the turning movement of the shaft 6 and arm 7, thus permitted, will be greater or less according to the deflective position of the pointer 2' at the time. When the arm 7 thus turns counter-clockwise, a lateral projection 7' of that arm engages and turns a secondary pointer element 14 into a position corresponding to the then deflection of the pointer 2'. The secondary pointer 14 is loosely journaled on the shaft 6, and has a gravital loading tendency to turn in the clockwise direction as seen in Fig. 3, so that the arm 14 normally bears against the projection 7' of the arm 7.

Figure 2:
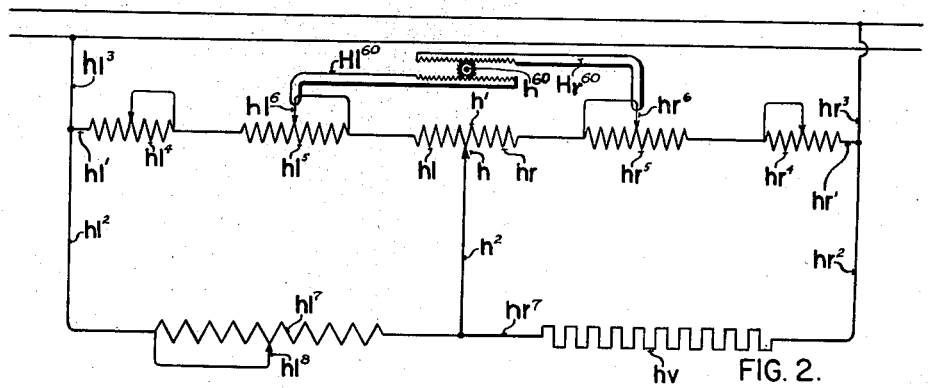
Fig. 2 is a diagrammatic representation of control circuit provisions adapted for use in the automatic adjustment of a thermally actuated control valve shown in Fig. 1.

At the end of each angular adjustment of the secondary pointer 14 into a position corresponding to the then deflection of the galvanometer 2, one or another of the three shoulders 15A, 15B and 15C of a locking member 15, engages the bottom wall of a slot 14' in the member 14 and thereby frictionally holds the latter in the position occupied by it when such engagement occurs. When the pointers 2 and 14 occupy their neutral positions, the shoulder 15B of the member 15 comes into locking engagement with the member 14. When the galvanometer pointer 2 has deflected to the right, as seen in Fig. 2, as it does when the actual value of the quantity measured is lower than that indicated by the previously made and still existing potentiometer adjustment, the secondary pointer 14 is engaged and locked by the shoulder 15C. When the galvanometer pointer deflects in the opposite direction from its neutral position, as it does when the actual value of the quantity measured is higher than that indicated by the existing potentiometer adjustment, the pointer 14 is engaged and locked by the shoulder 15A of the member 15. The locking part 15 is given a tendency to move into locking engagement with the secondary pointer 14 by the spring 10, but is periodically held out of such engagement by the action on its projection 15D of a projection 16A carried by a ratchet lever 16 pivoted at 16B.

A spring 16C gives the lever 16 a tendency to turn forward in the clockwise direction, as seen in Fig. 3, but throughout the major portion of each rotation of the shaft 12 the lever 16 is held in a retracted position by a cam 17 carried by said shaft and engaged by the cam follower roll 16D carried by the lever 16. The ratchet lever 16 is operatively connected to two pawls 16E and 16F cooperating with a toothed wheel 18. Each of said pawls has a gravital tendency to occupy a position in which it does not engage the teeth of the wheel 18, but one or the other of the pawls is brought into engagement with the teeth of the wheel on each forward or clockwise movement of the lever 16, if the locking part 15 is then at one side or the other of the intermediate or neutral position which it occupies when the galvanometer pointer 2' is in its neutral position.

The position assumed by the part 15 when in locking engagement with the secondary pointer 14 controls the action of the pawls 16E and 16F by virtue of the fact that a collar or hub portion 15''' of the part 15 carries a spring pawl engaging arm 15E. The movement of the locking part 15 into the position in which its shoulder 15A engages the secondary pointer 14 causes the arm 15E to move the pawl 16E into operative engagement with the teeth of the ratchet wheel 18, and the clockwise or forward movement of the ratchet lever 16 then gives a clockwise adjustment to the ratchet wheel. Conversely, when the part 15 moves into the position in which its shoulder 15C engages the secondary pointer 14, the arm 15E shifts the pawl 16F into operative engagement with the wheel 18, and the latter is then adjusted in the counter-clockwise direction.

The extent of the adjustment then given the wheel 18 is made dependent upon the position of the secondary pointer 14, as said position determines which of the various shoulders 16G' and 16G'' of an arm 16G carried by the lever 16 shall then engage a projecting portion 14'' of the secondary pointer 14 and thereby arrest the forward movement of the ratchet lever 16. In the neutral position of the galvanometer pointer and secondary pointer 14, the projection 14'' of the latter engages the central shoulder 16G'' of the arm 16G and the lever 16 is then held against any operative movement in the clockwise direction. When the secondary pointer position is more or less to one side or the other of its neutral position, the portion 14'' engages an upper or lower shoulder 16G' more or less distant from the central shoulder 16G'' and the lever 16 is then permitted more or less forward movement.

The rotation of the wheel 18 in one direction or the other effects corresponding potentiometer rebalancing adjustments and position adjustments of the recorder carrier 23. The rebalancing adjustments are effected by means of a rheostat shaft 19 which is geared to the shaft 18' on which the wheel 18 is secured. The rotation of the shaft 19 moves bridging contact 20 along the convolutions 21 of a potentiometer resistance helically disposed about the axis of the shaft 19, and thereby varies the amount of said resistance in the potentiometer circuit. The resistance adjustments made in response to a deflection of the galvanometer pointer in one direction away from its neutral position rebalances, or tends to rebalance, the potentiometer circuit and thereby returns, or tends to return, the galvanometer pointer to its neutral position.

The rotation of the wheel 18 adjusts the recorder carrier 23 by virtue of the fact that the teeth of the wheel 18 are in mesh with the teeth of a gear carried by a carriage adjusting shaft 22 which is in threaded engagement with the pen carriage. The shaft 22 is formed with a thread groove 22' of coarse pitch which receives a cam or mutilated screw thread rib 23' (see Fig. 5) secured to the carriage 23, so that the latter is moved longitudinally of the shaft 22 as the latter is rotated.

The marker carriage 23 comprises a frame portion formed of a single piece of sheet metal cut and bent to form a flat underbody portion with uprising projections. Those projections include two apertured ears 23a at the rear corners of said body portion transverse to and through which the shaft 22 extends; two projections 23b, one at each front corner of said body portion which bear against the inner edge and upper side of the lower flange of a channel bar or rail 24 forming part of the instrument framework, and three intermediate projections 23c which extend in vertical planes transverse to, and are arranged in a row parallel to, the shaft 22 and rail 24. In addition the body portion of the carriage frame is provided with a forwardly extending tongue passing beneath the rail 24 and terminating in an uprising pointer or index 23d adapted to cooperate with a scale marked on the front face of the rail 24 to indicate the position of the pen carriage, and the value of the quantity measured and recorded by the instrument.

The projections 23c support a small shaft 23e forming a support for a pen support 23f on which the pen 25 is pivotally supported with its marking end in engagement with a record sheet 26. The shaft 23e also supports parts cooperating with a bar 42 to effect adjustments of the pen support 23f which compensate for the expansion and contraction of the record sheet 26 caused by changes in atmospheric humidity. Such compensating provisions do not vary the position of the pen recorder carriage 23 though they vary the position of the pen or other marking element supported by said carriage, and form no part of the present invention and therefore need not be described herein.

The record sheet 26 passes over and is given feeding or advancing movements by a record feed roll 27. The latter is carried by a shaft Z' intermittently rotated by means, hereinafter described, actuated by the rocker 8 on each oscillation of the latter.

Figure 3A:
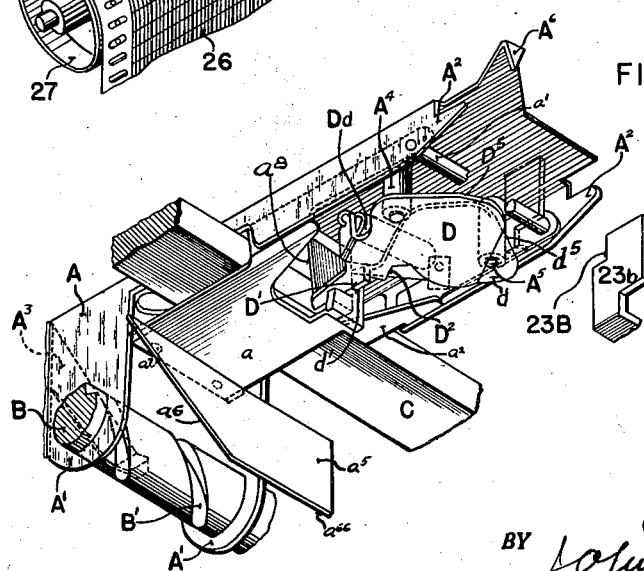
Fig. 3A is a perspective view of the control table and immediately related parts of the instrument shown in Fig. 3.

The control table A of the instrument shown in Figs. 3 and 3A comprises a sheet metal frame having ear portions A' apertured for the passage of a shaft B mounted in the instrument framework alongside the shaft 22 and having bearing parts $A^2$ which engage and slide along the upper flange of the rail 24 To facilitate the adjustment of the control table A along the path of travel of the pen carriage 23, the shaft B is shown as formed with a thread groove B' receiving a cam or mutilated thread rib part $A^3$ secured to the control table frame. The shaft B may be rotated to adjust the control table in any suitable manner as by means of the transverse shaft geared to the shaft B and rotated by an operating handle or knob B³ at the front of the instrument, as shown in Fig. 1. An index A⁶ in conjunction with a scale on the front face of the rail 24 may indicate the adjustment of the table and the corresponding normal value of the quantity measured.

A member $a$ is hinged at one edge to the frame of the control table A by a pivot or pintle shaft $a'$ extending parallel to the shaft B. The member $a$ is formed with guiding provisions including a part $a^2$, for a bar-like part C which extends parallel to the shaft B and is rigidly secured at its ends to arms C' and C² which are pivotally connected to the instrument framework so that the yoke-like structure formed by the bar C and arms C' and C² may turn with respect to the instrument framework about an axis C⁴ coinciding with that of the hinge connection $a'$, between the table A and part $a$. The part $a$ and bar C are held by the said guiding provisions against independent turning movements about the axis of their respective pivotal supports. The part $a$ and bar C have a gravital tendency to move from their elevated positions, shown in dotted lines in Fig. 5, into or toward their lowermost positions. Their movement downward below their last-mentioned positions is prevented by the engagement of a projection C³ from the arm C² with an adjacent portion of the instrument framework. The parts $a$ and C are positively held in their uppermost positions by the action of a spring FA³, except during the portion of each revolution of the shaft 12 when the cam 11 renders the spring FA³ inoperative to prevent such movement, as is hereinafter described. The extent to which the parts $a$ and C are permitted to swing downwardly from their uppermost positions during each period when the action of the cam 11 renders the spring FA³ temporarily inoperative, depends upon the then relative positions of the table A and the recorder carriage 23, and upon other operating conditions later described. When the value of the quantity measured is so low that the carriage 23 is entirely at the low side (left-hand side, as seen in Fig. 3) of the control table A, the carriage 23 does not interfere with the movement of the parts $a$ and C into their lowermost positions.

When the current value of the quantity measured is suitably close to the normal value of that quantity, the control table and marker carriage 23 are in such relative positions that downward movement of the hinged part $a$ is prevented or restricted by the engagement of a portion of that part with the marker carriage 23. For purposes of such engagement the part $a$, as shown in Figs. 3, 3A, and 8, has a carriage engaging portion $a^5$ detachably secured to it. The part $a^5$ is in the form of a plate with a downwardly projecting body portion terminating in a lower oblique edge $a^6$, and having at its upper edge a lateral flange portion bearing against the underside of the part $a$ at the rear edge of the latter and detachably secured thereto by clamping screws $a^7$. The bodies of said screws pass through slots in the part $a$ which are open at the rear edge of the latter.

The lower edge $a^6$ of the projection $a^5$ is so disposed that it may engage and rest upon the shoulder 23C formed by the upper edge of the projection 23c at the high side of the recorder carriage 23 (the right hand side, as seen in Fig. 3), when the position of said carriage is such as to hold the shoulder 23C beneath said edge $a^6$.

When the indices 23d and A⁶ coincide, indicating that the predetermined normal condition of the quantity then exists, the midpoint of edge $a^6$ will be directly over the right-hand edge of shoulder 23C. As the carriage 23 deflects above and below its normal position, the point of contact of shoulder 23C and edge $a^6$ varies so as to raise and lower bar C. The highest operative position of edge $a^6$ corresponds to the position in which horizontal edge $a^{66}$ of part $a$ contacts shoulder 23C. The dotted position of Fig. 5 is an inoperative or clearance position in which part $a$ cannot interfere in any way with the movements of the marker carriage which are given the latter while the part $a$ is held in said clearance position.

When an increase in the value of the quantity measured results in a movement of the recorder carriage 23 to the high side of the control table A, that movement causes the part $a$ to be positively secured against down movement from its uppermost operative position by adjusting latch member D, into its latching position. The latch D is pivotally mounted on a stud A⁴ depending from the underside of the plate-like body of the table A. In the latching position of the member D, a finger-like portion of the member extends beneath a portion $a^8$ of the part $a$ which is some distance to the rear of the hinge shaft $a'$.

Latch member D is automatically moved into and out of its latching position, as the carriage 23 moves to and returns from the high side of the control table A, by means which include a vertically disposed shoulder or edge 23B of the projection 23b at the low side front corner of the recorder carriage frame, a member $d$ pivotally mounted on a stud A⁵ depending from the underside of the control table frame alongside the stud A⁴, and a spring $Dd$ connecting the members D and $d$. The spring $Dd$ tends to move the member D in the counter-clockwise direction, as seen in Fig. 3A, and to move the member $d$ in the opposite direction about their respective pivotal supports A⁴ and A⁵; such turning movements of the members D and $d$ are prevented by the engagement of the finger portion $d'$ of the part $d$ with the shoulder D' of the member D, when the latter is in its latching position, as shown in Fig. 3A. In the non-latching position of the member D, the finger $d'$ engages a shoulder D² of the part D.

The members D and $d$ are moved from the latched position shown in Fig. 3A into the unlatched position and back again into the position shown in Fig. 3A by the engagement of the recorder carriage shoulder 23B with the cam-shaped front edges D⁵ and $d^5$ of the members D and $d$, respectively. The edges D⁵ and $d^5$ are so respectively shaped and disposed that as the carriage moves to the high side of the control table, the shoulder 23B acts on the edge $d^5$ to turn the member $d$ counter-clockwise, as seen in Fig. 3A, so that the spring $Dd$ may then move the member D into its latching position in which its shoulders D' engage the finger $d'$. When the carriage subsequently moves back from its high position, the shoulder 23B engages edges D⁵ of the member D and moves the latter into its non-latching position while permitting the spring $Dd$ to move the member $d$ into the position in which its finger $d'$ engages the shoulder D² of the member D, and holds the latter in its non-latching position.

The means through which the spring FA³ normally prevents movement of the control table part $a$ out of its clearance position, and through which the rising and falling movements of the bar C and part $a$ effect control functions, include a floating member E connected by a link $C^5$ to the arm $C^2$, and parts associated with the member E. The latter is pivotally connected at EF to the part F of a compound lever comprising parts F and FA each pivoted to the instrument framework at F' and normally held against relative movement by a spring FB. The latter tends to hold the part F in engagement with a projection FA' of the part FA, but serves as a safety device which may yield to prevent injury of the parts in case the switch parts actuated by the member should jam; the spring $FA^3$ extends between the upper end of the lever part FA and the instrument framework, and tends to hold the parts F, FA and E in the positions shown in dotted lines in Fig. 5.

The lever part FA is moved from the dotted line position into the full line position of Fig. 5 once during each rotation of the shaft 12, by the cam 11, which then engages a cam roll follower $FA^2$ carried by the lever part FA.

When the parts are in the positions shown in dotted lines in Fig. 5, the lower cam edge E' of the member rests upon a roller support $e$ mounted on the instrument framework, and the position of the member E is then such that the link $C^5$ holds the part $C^2$ and thereby the bar C and control table part $a$ in their uppermost positions. When the lever part F is turned in the clockwise direction from its Fig. 5 dotted line position, the weight of the part E adds to the gravital tendency of the bar C and table part $a$ to turn downward, and the parts last mentioned then move downward into the position shown in full lines in Fig. 5, unless further movement is prevented by the control table latch D, or by the engagement of the edge $a^5$ with the recorder carriage shoulder at 23C.

The movement of the member E into the full line position shown in Fig. 5 adjusts a control element H about its stationary supporting shaft I into a position, unless already in that position, which corresponds to and is determined by the then existing elevation of the member E which is determined by the position at the time of the part $C^2$. The position of the member H following each advancing movement of the member E is made dependent on the elevation of the member E through the co-action of fingers G' and $G^2$ carried by the member E with lateral extensions H' and $H^2$ from an arm secured to the frame H and located at opposite sides of the shaft I. When the measured quantity is at its normal value, so that the shoulder 23C of the carriage 23 is in position to engage the midpoint of the oblique edge $a^6$ of the control table A, the oppositely inclined engaging edges of the fingers G' and $G^2$ so engage the fingers H' and $H^2$, respectively, as to turn the member H into its central or normal position, shown in Fig. 7, if not already in that position. When the carriage 23 is deflected to the right or the left of its normal value position as a result of the departure of the quantity measured above or below its normal value, the point of the control table edge $a^6$ engaging the carriage shoulder 23C will so raise or lower the member E that the fingers G' and $G^2$ and projections H' and $H^2$ will insure a position of the member H displaced clockwise or counter-clockwise, respectively, from the normal position illustrated in Fig. 7. Any deflection of the carriage 23 thus produces a corresponding change in the angular position of the frame H.

The frame H carries a contactor $h$ in sliding engagement with a resistor $h'$ shown as helically wound about a support extending parallel to the chord of the arcuate movement of the contactor $h$ occurring as the member H is oscillated about the shaft I. One end of a conductor $h^2$ is connected to the contactor $h$ and through the latter is connected to the resistor $h'$ at a point along the length of the latter which depends upon the angular position of the frame H. The resistor $h'$, contactor $h$, and conductor $h^2$ constitute part of a control circuit, of which one form is shown in Fig. 2 and a different form is shown in Fig. 2A, which is adapted to effect adjustment in the rate of heat supplied to the burner $U^{13}$ on a change in position of the contactor $h$ resulting from a change in the glass temperature to which the thermo-couple 15' responds.

The control circuit shown in Fig. 2 comprises two branch circuits connected in parallel with one another to a source of current through supply conductors $hr^3$ and $hl^3$. The sidewire resistor $h'$ is included in one of said branch circuits and the conductor $h^2$ connects the contact $h$ to an intermediate portion $hr^7$ of the other branch circuit. Each of the two branch circuits thus forms two arms of a bridge circuit energized by the conductors $hr^3$ and $hl^3$ and comprising arms $hr'$, $hl'$, $hr^2$, and $hl^2$. The bridge arms $hr'$ and $hl'$ include relatively fixed resistances $hr^4$ and $hl^4$, respectively, which when once calibrated are not changed during the normal operation of the instrument. The arms $hr'$ and $hl'$ also include resistances $hr^5$ and $hl^5$ adapted for manual adjustment to vary the sensitivity of the control as hereinafter described. The resistor $h'$ includes a portion $hr$ in the arm $hr'$, and has its remaining portion $hl$ included in the arm $hl'$. The relative magnitudes of the portions $hr$ and $hl$ of the resistance $h'$ depends upon and varies with the adjustment of the contactor $h$ effected by the angular adjustment of the frame H. The bridge arm $hr^2$ includes the heating resistance $hv$ of the thermally actuated valve V of known type shown in Fig. 1, and the arm $hl^2$ includes a resistor $hl^7$ which is adjustable by means of a sliding contact $hl^8$.

When a decrease in the spout temperature to which the thermo-couple 15' responds produces a deflection of the pen carriage 23 resulting in a movement of the contact $h$ to the left as seen in Fig. 2, the resultant decrease in resistance of arm $hl'$ relative to that of arm $hr'$, results in an increase in the current flow through the heating resistance $hv$ of the valve V, and gives an opening adjustment to the latter and thereby increases the fuel supply to the burner $U^{13}$. Conversely an increase in the spout temperature and an adjustment of the contactor $h$ to the right as seen in Fig. 2, and the resultant changes in the relative resistances of the arms $hr'$ and $hl'$ will decrease the current flow through the heating resistance $hv$ and subject the valve V to a closing adjustment.

In the operation of the apparatus shown, insofar as it has been described, on the attainment of the predetermined normal spout temperature, the valve V will have a particular predetermined adjustment. Unless that adjustment is exactly the adjustment required for the supply by the burner $U^{13}$ of the amount of heat needed for the maintenance of the predetermined normal temperature, the latter will not be maintained. In practice, the amount of heat which the burner $U^{13}$ must furnish to maintain the predetermined normal temperature will vary from time to time. With the apparatus shown, the current flow through the resistance $hv$ and thereby the adjustment of the valve V, when the contact $h$ is in its neutral normal temperature position, may be varied by adjustment of the contact $hl^8$. Under certain conditions of use it is sufficient to provide means for effecting a manual adjustment only of the contact $hl^8$. Under other conditions, it is desirable to provide not only for the manual adjustment of the contact $hl^8$, but an automatic compensating adjustment of the contact, whereby on an increase or decrease of the spout temperature from its normal value, a suitable adjustment of the contact $hl^8$ will be made to thereby decrease or increase the normal current flow through the resistance $hv$ when the spout temperature is at its normal value.

The above mentioned compensating adjustment is effected with the form of apparatus shown, by means of a contact member $hC$ carried by the shaft I alongside the contact member $h$ and engaging one or another or neither of two conductors $hC'$ and $hC^2$ mounted on a support $hC^3$, accordingly as the shaft I is deflected in one direction or the other from, or is in its neutral position. The engagement of the contact member $hC$ with the conductor $hC'$, occurring on a fall in the spout temperature above its normal value, results in the energization of a motor HC in the direction required to adjust the contact $hl^8$ to the right as seen in Fig. 2, and thereby increase the current flow through the resistance $hv$. To this end, as shown in Fig. 6, the motor HC includes a field winding $HC'$ connected in series with the conductor $hC'$ and the armature of the motor HC between motor energizing conductors $HC^{10}$ and $HC^{11}$. Conversely on a rise of the spout temperature above its normal value, the deflection of the contact member $hC$ into engagement with the conductor $hC^2$, completes an energizing circuit between the conductors $HC^{10}$ and $HC^{11}$ including a second field winding $HC^2$ in series with the conductor $hC^2$ and motor armature and the motor HC is energized in the direction to decrease the current flow through the valve resistance $hv$.

As the compensating adjustment normally required is small, and in any event may advantageously be effected intermittently, the conductor $HC^{11}$, in the arrangement shown, is energized by means of a switch $HC^5$ only when the latter connects the conductor $HC^{11}$ to a conductor $HC^{12}$. As shown, the switch $HC^5$ is actuated once during each rotation of the constantly rotating instrument shaft 12 by means of a switch actuating cam $HC^6$ carried by the shaft 12. With the arrangement shown diagrammatically in Fig. 6, the motor HC will be periodically energized and produce corresponding adjustments of the contacts $hl^8$, during the smaller portions of time in which the instrument is not operative for its normal control purposes, as well as during the larger portions of time in which the instrument is so operative. The automatic adjustment of the contact $hl^8$ during periods in which the instrument is not effecting its normal control functions is not seriously objectionable and ordinarily does not justify the slight additional instrument complication such as the inclusion of a second switch in series with the switch $HC^5$ and actuated, for example, by the means hereinafter described for operating the switch 39, so as to permit the motor HC to be energized only when the instrument is effecting its normal control functions.

As shown diagrammatically in Fig. 6, the armature shaft of the motor HC is connected to the shaft $HC^4$ carrying the contact $hl^8$ through a friction clutch $HC^3$, and the shaft $HC^4$ is gear connected to a knob $hl^{80}$ mounted in the instrument panel, and by means of which the contact $hl^8$ may be manually adjusted at any time.

As an alternative to the adjustment of resistor $hl^7$ through contacts $hC$, $hC^1$ and $hC^2$ as just described to alter the normal current adjustment we may attain the same end of altering the normal fuel supply by direct mechanical actuation of valve V as shown in Fig. 1. In Fig. 1 we have indicated the motor HC in dotted lines as connected to a throttling valve $V^1$ governing the supply to valve V. The valve $V^1$ may be and in practice is formed integral with valve V and is provided with a shaft $V^2$ which we have shown as geared to reversible motor HC. The motor HC is energized as described in connection with Fig. 6. By this means the fuel flow to valve V is variably throttled and obviously a by-pass connection about valve V could be utilized to the same end.

In addition to the normal current adjustment just described and the normal temperature adjustment effected by operation of the knob $B^3$ to adjust the control table A along the path of the marker carriage 23, it is highly desirable to adjust the control circuit so as to vary the sensitivity of the control effect, i. e. to vary the change in the fuel supply to the burner $U^{13}$ resulting from a given change in the spout temperature to which the thermo-couple 15' responds. As shown in Fig. 2, the sensitivity adjustment is effected by simultaneously increasing or decreasing the amounts of the resistances $hr^5$ and $hl^5$ included in the bridge arms $hr'$ and $hl'$ respectively. To this end, as diagrammatically shown in Fig. 2, the contacts $hr^6$ and $hl^6$ by which the amounts of the resistances $hr^5$ and $hl^5$ in circuit are respectively adjusted, are carried by rack bars $Hr^{60}$ and $Hl^{60}$. The latter are at opposite sides of, and in mesh with a spur gear $h^{60}$ which may be rotated as by means of a knob $h^{61}$ mounted on the panel T'. Rotation of the gear $h^{60}$ in one direction will increase the amounts of the resistances $hr^5$ and $hl^5$ in circuit and thereby diminish the control sensitivity, and its rotation in the opposite direction will diminish the amounts of the resistances $hr^5$ and $hl^5$ in circuit and increase the control sensitivity. The sensitivity adjustment thus provided, permits of a wide variation in the range of adjustment of the fuel supply, and a consequent variation in the frequency of the swings in glass temperature resulting from changes in the glass spout temperature due to changes in the temperature at which the glass is supplied to the channel or other causes extraneous to the control system and to the compensating and temperature restoring action of the burner $U^{13}$.

The advantage of the sensitivity adjustment provided for in the circuit arrangement of Fig. 2 may be obtained in other control circuits, and is obtained in the control circuit of Fig. 2A which is adapted for alternative use with the circuit of Fig. 2, in the apparatus of Fig. 1. The control circuit of Fig. 2A is employed to actuate a reversible motor $H^9$ for adjustment of a motor actuated fuel valve V' which may be used in lieu of the two valves V and V' of Fig. 1. The control circuit of Fig. 2A includes a bridge portion generally similar to the bridge of Fig. 2, but in which the arms $Hr^2$ and $Hr^3$ correspond to the arms $hr^2$ and $hl^2$ of Fig. 2, respectively. The arm $Hr^2$ and $Hr^3$ include resistance windings $Hr^7$ and $Hl^7$, respectively, which act inductively on and control the position of a floating armature $H^3$, which is held in an intermediate position or is shifted to the right or left, respectively, as seen in Fig. 2A, accordingly as the current flow through the winding $Hr^7$ is equal to, exceeds, or is less than the current flow through the winding $Hl^7$. The longitudinal movement of the armature $H^3$ away from its neutral position moves a contact $H^4$ pivoted at $H^5$ into engagement with a contact $Hr^8$, or a contact $Hl^8$, dependent on the direction of armature movement, neither of the last mentioned contacts being engaged by the contact $H^4$ when the armature $H^3$ is in its neutral position.

The motor $H^9$ is energized for rotation in one direction when the contact $H^4$ engages the contact $Hr^8$, through a circuit including supply conductor $H^{10}$, contact $H^4$, contact $Hr^8$, conductor $Hr''$, motor winding $Hr^{10}$ and supply conductor $H^{12}$. Movement of the contact $H^4$ into engagement with the contact $Hl^8$ energizes the motor $H^9$, for rotation of its armature $H''$ in the opposite direction through an energizing circuit similar to that just described except that it includes motor winding $Hl^{10}$, conductor $Hl''$ and contact $Hl^8$ in lieu of the motor winding $Hr^{10}$, conductor $Hr''$ and contact $Hr^8$.

The rotation of the motor $H^9$ in one direction or the other gives a corresponding angular adjustment to a contact $H^7$, the position of which thus corresponds to the position of the movable member of the valve $V'$. The contactor $H^7$ is connected by a conductor $H^8$ to the common junction of the windings $Hr^7$ and $Hl^7$, and engages, and is adjustable along a slidewire resistance $H^6$, which is connected in shunt to the bridge circuit branch including the arms $Hr^2$ and $Hr^3$.

In the normal position of the contactor $h$ corresponding to the normal value of the spout temperature, the floating armature $H^3$, the contactor $H^7$ and the movable member of the valve $V'$ will all be in, or move into, their normal midpositions. A change in the spout temperature resulting in an adjustment of the contactor $h$ will unbalance the current flows in the windings $Hr^7$ and $Hl^7$ and thereby set the motor $H^9$ in operation to effect the same kind of adjustment in the fuel supply to the burner $U^{13}$ as would result from the same adjustment of the contactor $h$ with the circuit arrangement of Fig. 2 provided that the sensitivity adjustment is the same in Fig. 2A as in Fig. 2. The arrangement of Fig. 2A differs from that in Fig. 2, however, in that the movement of the motor $H^9$ which adjusts the valve $V'$ also adjusts the contact $H^7$. The adjustment of the contact $H^7$ resulting from the operation of the motor $H^9$ tends to rebalance the current flow in the windings $Hr^7$ and $Hl^7$ and continues until rebalance is adjusted. In consequence, on any change in the control temperature and consequent change in the position of the contactor $h$, the motor $H^9$ operates until the position of the movable valve member of the valve $V'$ and the position of the contactor $H^7$ are in predetermined correspondence with the position of the contactor $h$. What that correspondence may be depends upon the sensitivity adjustment of the circuit and is varied by a variation in that adjustment.

The above mentioned application Ser. No. 546,290 discloses a multiple recorder having provisions for intermittently printing independent records of various quantities. For the purpose of the present invention we advantageously employ so-called "pen dragging" means forming a continuous record line as shown in Fig. 11, different readily distinguishable portions of which show the spout and channel temperatures. Advantageously, and as shown, the time cycle of operation of our recorder controller instrument is divided into three stages which are respectively represented in Fig. 11 by consecutive curve portions 26b—26c, 26c—26d, and 26d—26b.

During the period or stage in which each curve section 26b—26c is being traced, the channel thermocouple 15'' is connected to the potentiometer measuring circuit and that period is terminated as soon as the instrument attains a predetermined condition or status hereinafter explained, which is assumed to and normally does insure a true measurement of the thermocouple voltage. At the termination of each of the periods or stages just referred to the switch 39 is actuated, as hereinafter explained, to disconnect the thermocouple 15'' from and to connect the thermocouple 15' into the measuring circuit. That condition or status is normally attained when a predetermined plurality of consecutive rebalancing operations occur without requiring adjustment of the pen carriage 23 and contactor 20. With the considerable difference between the temperatures indicated on the chart by the lateral displacement of points 26b from the points 26c, a number of instrument rebalancing operations will occur as the pen is moving to the left, as seen in Fig. 11, from any point 26b to the following point 26c, but the adjustment of the pen carriage and contactor 20 effected at each rebalancing operation will be insufficient to fully balance the potentiometer circuit. After the pen point reaches the point 26c, which represents a true measure of the channel temperature, a small number of subsequent consecutive rebalancing operations can ordinarily occur without producing any adjustment of the carriage 23 and contactor 20, under the normal condition in which the channel temperature changes so slowly that time required for a large number of consecutive rebalancing operations may elapse before the channel temperature changes enough to require a change in measuring adjustment of the contactor 20 and carriage 23. The different points 26c thus collectively constitute a sufficient record of the channel temperature during the time in which those record points are formed.

The spout temperature measuring thermocouple 15' is connected to the potentiometer measuring circuit during each period or stage in which a curve section 26c—26d is being formed, and the latter is formed by instrument operations similar to those which result in the formation of a curve section 26b—26c.

With the particular form of mechanism disclosed, the shaft 34 is advanced a twelfth of a turn at the end of each stage during which a curve section 26c—26d is formed and thereby initiates the third stage represented by the corresponding curve section 26d—26b. As hereinafter explained, however, the character of the switch 39 is such that the replacement of the thermocouple 15' by the thermocouple 15'' in the measuring circuit requires the two 30° movements of the shaft 34 at the beginning and end of the last mentioned period or stage. The latter would be completed sooner than is desirable but for means, hereinafter described, for rendering the means for rotating the shaft 34 inoperative during a predetermined time interval following the initiation of each stage in which a curve section 26d—26b is formed. During each stage represented by a curve section 26d—26b, control effects are produced dependent upon the spout temperature measurements then being recorded.

But for provisions now to be described, the instrument would produce undesired control effects during the periods in which the curve sections 26b—26c and 26c—26d are being formed. While the channel thermocouple 15" is connected into the measuring circuit, control effects are not wanted, of course, since the control provided is responsive to the spout temperature only control actions while a curve section 26c—26d is being formed are undesirable because, as already explained, the instrument does not give a true measurement of the spout temperature until the section is practically completed.

For the particular use of the invention described it is desirable that the instrument should measure and record the spout temperature and produce control effects in accordance therewith throughout as large a portion of the time as is consistent with suitably frequent measurements of the channel temperature, and, as indicated in the chart, the fixed time interval corresponding to the distance longitudinally of the chart between each point 26d and the following point 26b is appreciably greater than that represented by the corresponding distance between each point 26b and the following point 26d. The last mentioned distance may vary somewhat since it corresponds, as will be apparent from what has been said, to the time required for a variable number of rebalancing operations.

The switch 39 which connects the thermocouple 15' and 15" alternately into the measuring circuit, is shown in Figs. 8 and 9 as mounted on the instrument side plate at the left hand side of the instrument as it appears in Fig. 3. The switch 39 may be of the type disclosed in the Harrison patent, 1,770,918, granted July 22, 1930, and is actuated by the rotation of a shaft 34, which in the form shown is given intermittent angular movements in the direction indicated by the arrow in Fig. 8, and each of 30°. Twelve intermittent movements are thus required for a complete revolution of the shaft 34, and during each revolution of the shaft 34, therefore, the instrument completes its above mentioned three-stage cycle of operation four times. For the three-stage cycle operation described herein it would be possible to arrange for a complete revolution of shaft 34 in three steps instead of 12, but with the 12 steps the instrument has a desirable flexibility or adaptability for other uses. The switch contacts are carried by a shaft to which is fixed a gear 39a in mesh with and driven by a gear 34a carried by a shaft 34, the gear ratio being such that the switch shaft makes two revolutions for each revolution of the shaft 34. As will be apparent for the three-stage cycle operation described, the switch contacts must be so arranged that the thermocouple 15" will be connected into the measuring circuit while the gear 39a makes a sixth of a revolution and so that the thermocouple 15' will be connected into the measuring circuit during the subsequent movement of the gear 39a through a third of a revolution, after which the thermocouple 15" is again connected in the circuit while the gear 39a makes another sixth of a turn, etc. The periods during which the thermocouple 15" and 15' are in circuit are indicated by the movement of a pointer 39e along the arcs Ch and SP of the dial 39' shown in Fig. 10. The pointer 39e is carried by a shaft 39c on which is fixed a gear 39b in mesh with the upper end portion of the gear 39a, the gear ratio of gears 39a and 39b being 1 to 1.

The shaft 39c, which carries the pointer 39e at one end, carries at its end a control holdout device 39d comprising disc parts 39d' and 39d" which serve to hold the control instrumentalities out of operation except during the periods or stages in which curve sections 26d—26b are being formed and in which the pointer 39e is moving through along the second half of each dial arc SP. The disc parts 39d' and 39d" are provided with peripheral notches so related that the composite disc formed by the two parts 39d' and 39d" when clamped together by the clamping screw 39d''', will have one or more peripheral notches depending on the relative angular positions of the parts 39d' and 39d". For the particular instrument use illustrated herein, the two disc parts are relatively disposed to provide two diametrically opposed peripheral notches 39f and 39f' as is shown clearly in Fig. 9. During each control stage in which the pointer 39e is moving through the last half of each arc SP of the dial shown in Fig. 10, a lever $C^8$ turning loosely on the shaft 34 may dip into one or the other of the notches 39f and 39f' while during the other stages similar down movements of the lever $C^8$ are prevented by the engagement of the latter with unnotched portions of the composite disc periphery. The lever $C^8$ is connected by a link $C^7$ and pivot pin $C^6$ to the previously mentioned arm $C^1$ which moves up and down with the control bar C. During the stages in which the curve sections 26b—26c—26d are being formed, the bar C is prevented from moving downward from a position which corresponds substantially to, but is slightly below its dotted line position shown in Fig. 5 by the engagement of the lever $C^8$ with an unnotched peripheral portion of the device 39d. The elevated position in which the bar C and arm $C^2$ are then held, makes the elevation of the device E such that when the latter is advanced its fingers $G^1$ and $G^2$ pass above the control frame projections $H^1$ and $H^2$, respectively, and in consequence cannot then subject the frame H and contactor h to a control action.

An alternative means for elevating to and holding bar C in the raised position just described is shown in Fig. 8A. In Fig. 8A a cam 39D secured to shaft 34 is adapted to rotate with the latter and positively raise a link $CA^7$ corresponding to link $C^7$ of Fig. 8 thereby raising arm $C^1$ to which it is pivoted at $C^6$. The link $CA^7$ is bifurcated at its lower end and surrounds a bushing secured to shaft 34 which bushing serves as a guide for the vertical motion of the link. A roller $CA^1$ carried by lever $CA^7$ is adapted to ride on the edge of cam 39D in the latter of which is provided the depressions 39F, $39F^1$, $39F^2$ and $39F^3$ corresponding in purpose to depressions 39f and $39f^1$ of Fig. 9. The lever $CA^7$ is free to drop four times in each revolution of shaft 34 if the relation of table a and carriage 23 is such as to permit downward motion, the four stages in which roller $CA^1$ is opposite a depression in cam 39D corresponding to the controlling stage in which pointer 39e is at the latter portion of the area indicated as "2" in Fig. 10.

The mechanism through which the shaft 34 is given its successive 30° turning movements required for the production of the curve shown in Fig. 11, is illustrated in Figs. 4 and 4A, which are elevations of the instrument as seen from the side of the latter opposite to that shown in Fig. 8. At the side of the instrument shown in Figs. 4 and 4A, a ratchet wheel 36 is secured to the shaft 34, a keeper 36' preventing counter-clock rotation of the ratchet wheel. The ratchet wheel 36 has 12 teeth and is advanced one tooth by a pawl 37 on each down stroke of the latter except when the pawl is held in an inoperative position by a pawl hold out lever Y which, as hereinafter explained, holds the pawl 37 in an inoperative position during the periods in which the record curve sections 26d—26b are being formed, as is hereinafter described.

The pawl 37 is pivoted at 37'', to a pawl lever 38, the latter being freely pivoted on shaft 34. A spring 43 tends to hold the pawl 37 against the periphery of the wheel 36 and normally holds the ratchet lever 38 in its uppermost position in which it bears against a fixed stop 44.

The ratchet lever 38 is turned clockwise from the position shown in Fig. 4 about the shaft 34 to advance the wheel 36 one tooth (i. e., one-twelfth of a revolution) on each oscillatory movement of the previously mentioned rocker 8 in the counter-clockwise direction occurring at a time in which a lever 46 holds a thrust member 45 in the full line position shown in Fig. 4 in which said member bears against a stop 44. In that position, the member 45, which is pivoted on the pivot pin 37', acts as a thrust block interposed between the pivot pin 37' and the projection 8'' at the end of the arm 8' of the rocker 8. The turning movement about the shaft 34 then given the lever 38 as the projection 8'' descends, carries the arm 38'' of lever 38 into the position 38A shown in dotted lines in Fig. 4, and in turning into its dotted line position, the arm 38'' engages the lower end 46'' of the lever 46 and the lower end 48'' of another lever 48 and turns those levers into the positions indicated by the dotted line positions of their lower ends shown in Fig. 4. As the rocker arm 8' makes its return upstroke, the spring 43 returns the lever 38 to its full line position, but does not effect a corresponding return movement of the lever 46. In consequence, the member 45 then is gravity held on its dotted line position shown in Fig. 4, in which it rests against pin 37'' carried by the lever 38, and in which its upper end is out of the path of movement of the projection 8''. No subsequent counter-clockwise rotation of the rocker 8 gives movement to the lever 38 and ratchet wheel 36 until the lever 46 is again returned to its full line position.

The lever 46 is returned to its full line position as a result of a plurality of rebalancing operations, said plurality varying from a minimum of two up to a predetermined but adjustable maximum which may well be from 6 to 20 or thereabouts, and which is fixed by means hereafter described. The levers 46 and 48 are mounted to turn about the supporting stud 9 for the rocker 8, and are so mounted as to have a frictional tendency to remain in the positions assumed by them until subjected to external forces displacing them from such positions. The lever 46 is returned to its full line position by the direct, indirect or partly direct and partly indirect action of a pawl 47 pivoted at 47' to an arm of the rocker 8. The direct action on the lever 46 of the pawl 47 occurs when the pawl engages with one or first with one and then with another of two teeth 46' carried by the upper end of the lever 46. The indirect action of the pawl 47 on the lever 46 results from the engagement by the pawl of the teeth 48' carried at the upper end of the lever 48 and the movement of the lower end of the latter against a projection 46a adjustably secured to the lever 46. Movement of the lever 48 under the action of the pawl 47 occurring after the lever has engaged the projection 46a, moves the lever 46 toward and may eventually move it into its full line position. The means for varying the number of teeth 48' by which it is necessary to move lever 48 before the lower end of lever 48 engages projection 46a, includes a notched sector 46b which carries projection 46a and which is pivoted at 9. One or another of notches 46c of sector 46b, according to the adjustment desired may be engaged by a projection 46d of lever 46 to thereby rigidly connect the projection 46a to the lever 46. In the adjustment shown in Fig. 4, twenty actuations of teeth 48' are required to move the block 45 into position for engagement by rocker arm 8' while but six such actuations would be required if the relative adjustment of lever 46 and sector 46b were such that uppermost tooth 46c engages projection 46d.

Whether or not on any particular clockwise rotation of the rocker 8 the pawl 47 will engage a tooth 46' of the lever 46 depends upon the position at the time of a tooth shielding member 49. The position of the member 49 at that time depends indirectly upon the position of the secondary pointer 14 and depends directly upon the position of the drive lever 16 when its advancing movement is arrested by the engagement of one of the shoulders of part 16G with the secondary pointer projection 14''. The position of the member 49 is so controlled as a result of the fact that it tends to turn clockwise under the action of gravity about the stud 9 to which it is pivotally connected and that its gravital movement is controlled by the engagement of a cam edge portion of the member 49 with an extension of the pivot pin 16D' on which the follower roll 16D is journalled.

In the neutral position of the secondary pointer 14'' and a perfect or approximately perfect condition of potentiometer balance in which the shoulder 16G'' engages the projection 14'', the part 49 is held in its uppermost position by the pin 16D'. The pawl 47 is then free to engage a tooth 48' and a tooth 46' at the beginning of its down stroke and to maintain such engagement until said stroke is completed. If in such case at the beginning of said stroke the lever 46 is in its position most remote from that shown in full lines in Fig. 4, the pawl 47 will then engage the lower tooth 46' and move the lever 46 into an intermediate position in which the pawl 47, on its following down stroke, can engage the second tooth 46', if the member 49 is then also in its uppermost position shown in Fig. 4. In such case the return of the member 46 to its full line position is effected by two potentiometer rebalancing operations and results from the direct action of the pawl 47 on the teeth 46'. While in such case the pawl 47 on each stroke would engage a tooth 48' of the lever 48 and give the latter the same turning movement as is given to the lever 46, the movement given to the lever 48 would not contribute to the return of the lever 46 to its full line position. From the foregoing, it will be apparent that in normal operation each actuation of the toothed wheel 36, effected through the parts 31 and 45 and the mechanism acting on the latter, institutes a new measuring period and terminates the measuring period which began with the previous actuation of the wheel 36 by the pawl 31, part 45 and mechanism acting on the latter. It will be noted further that each measuring period ends either when the measuring apparatus attains a predetermined measuring status, which, with the particular form of embodiment illustrated herein, is that resulting in perfect balance at two balancing operations during the measuring period, or at the end of a predetermined number of balancing operations when said status is not obtained with a smaller number of balancing operations.

When at the beginning of the down stroke of the pawl 47, the projection 14'' engages one of the upper or lower shoulders 16G' so that the pivot pin 16D' then occupies a position downward and to the left of that shown in Fig. 4, the member 49 will occupy a lower position in which it prevents the pawl 47 from engaging either tooth 46' or from engaging any tooth 48' until the down stroke of the pawl 47 is so nearly completed that it will advance the tooth 48' engaged, only for a distance corresponding to the distance between that tooth and an adjacent tooth 48'. If the series of rebalancing operations preceding each partial rotation of the ratchet wheel 36 includes none in which perfect balance is attained, the lever 48 will be advanced a tooth at a time until the predetermined number of such advances has caused the lever 48 to engage the projection 46a and move the lever 46 into its full line position. Whenever in that series of operations perfect balance is obtained, the next downstroke of the pawl 47 will directly move the lever 46 either into it said intermediate position or into its full line position and will correspondingly advance the lever 48. It will be apparent, therefore, that the lever 46 may be moved from its initial position into its full line position by the first two balancing operations of each if each of those operations results in perfect balance, or by any greater number of rebalancing operations including either one or two in which perfect balance is obtained up to a maximum number of rebalancing operations required for the return of the lever 46 by the advancement of the lever 48 one step at a time, in case perfect balance is not attained prior to the last down stroke of the pawl 47 required to return the lever 46 through the action of the lever 48.

The adjustment of the member 45 into the position shown in Fig. 4 during the stage in which the channel temperature is being measured results in the actuation of the shaft 34 which terminates that stage and initiates the second stage in which the potentiometer is balanced to measure the spout temperature. The movement of the member 45 into the Fig. 4 position during the last mentioned stage results in a movement of the shaft 34 which terminates that stage and initiates the third stage. The last mentioned movement of the shaft 34, while actually adjusting the switch 39, does not cut the thermocouple 15' out of and the thermocouple 15'' into the measuring circuit because of the switch characteristics already mentioned, but does advance the disc parts 39d' and 39d'' to bring one or the other of the notches 39f and 39f' into position beneath the lever C8, so that the instrument may then perform its control functions effected during each third stage.

When the member 45 is brought into its Fig. 4 position during each third stage operation, it does not result immediately in a corresponding partial rotation of the shaft 34 because of the means previously mentioned and now to be described for rendering the provisions for rotating the shaft 34 inoperative for a predetermined time interval. The means last referred to comprise a masking member Y pivoted at Y', which when in its position shown in Fig. 4 is idle, but when in its position shown in Fig. 4A, has its cam edge $Y^3$ in engagement with a roller 37a on the pawl 37 and holds the latter away from the ratchet wheel 36. While the pawl 37 is so held away from the ratchet wheel 36, downstrokes of the member 45 and pawl 37 then produced are idle strokes and give no movement to the shaft 34. The masking member Y is moved from its position shown in Fig. 4 to its position shown in Fig. 4A at the beginning of each stage in which control actions are effected in accordance with spout temperature measurements by the engagement of the member Y by a corresponding one of four pins 34b carried by a disc 34a secured to the shaft 34, the pins being equally spaced about the axis of the shaft.

The previously mentioned spring 43, which is connected at its lower end to the pawl 37, is connected at its upper end to the member Y and subjects the latter to a yielding force constantly tending to turn the member Y about the pivot pin Y' in the clockwise direction as seen in Fig. 4. The spring 43 is advantageously connected to the member Y through a member $Y^4$ which is pivotally mounted on the pin $Y^5$ carried by the member Y. Except under conditions hereafter referred to, the spring 43 holds the member $Y^4$ against the stop pin $Y^6$ and acts on the member Y as though connected to a rigid portion of the latter.

In the preferred construction shown, the instrument includes means normally operating to return the member Y to its Fig. 4 position at the end of a predetermined time interval following each movement of the member out of that position, said means comprising a cam member Z which is in effect a ratchet wheel. The cam Z is secured to the chart drive shaft $Z^1$. The shaft $Z^1$ is rotated slowly and at an approximately constant speed in the counter-clockwise direction as seen in Fig. 4, and may be so rotated by any usual or suitable chart advancing mechanism. In the particular instrument shown, the shaft $Z^1$ is rotated by a shaft $Z^2$ (Fig. 5) carrying a worm $Z^a$ (Fig. 3) which drives a worm wheel $Z^b$ mounted on the shaft $Z^1$ and preferably connected to the latter through a friction drive part $Z^c$ so that while the shaft $Z^1$ normally rotates with the gear $Z^b$, it may be manually adjusted angularly relative to the latter, as is occasionally desirable in effecting the proper time setting of the record chart and for other purposes. In the form of construction shown, the shaft $Z^2$ is intermittently advanced by a pawl and latch mechanism actuated by the arm 8' of the rocker 8, but that mechanism need not be described in detail herein as it forms no part of the present invention and is described in the above mentioned application, Serial No. 546,290, and in the above mentioned Patent No. 1,946,280. While the motion given by the mechanism to the shaft $Z^1$ is intermittent, the periodicity or frequency of its intermittent movements is so great, relative to the slow record chart movement, that the latter may be regarded as substantially constant.

The cam Z acts on the member Y to return the latter from its Fig. 4A position to its Fig. 4 position, by virtue of the fact that the movement of the member Y into its Fig. 4A position swings a shoulder $Y^8$ carried by the member Y into position for entrance between two teeth $Z^3$ of the cam Z, so that as the latter rotates, the rear tooth may engage the shoulder $Y^8$ and lift the member Y. The lifting movement of the latter normally continues until its surface previously engaged by a pin 34b as shown in Fig. 4A, is lifted above that pin. The tension of the spring 43 then turns the member Y into its Fig. 4 position which carries the shoulder $Y^8$ out of the path of the cam teeth $Z^3$. Advantageously, and as shown, the shoulder $Y^8$ is carried by the pivoted part $Y^4$ which can turn counter-clockwise about its pivot $Y^5$ against the tension of the spring 43 and thereby prevent the parts from jamming under certain conditions, as when it becomes desirable to give a manual reverse rotation to the chart shaft $Z^1$ while the shoulder $Y^8$ is entered between adjacent teeth $Z^3$ of the cam Z. In such case the counter-clockwise movement of any tooth $Z^3$ engaging the shoulder $Y^8$ will cam the latter out of the path of the tooth. The arrangement also prevents jamming in case the movement of the member Y into its Fig. 4A position occurs at such a stage in the rotation of the cam Z that the shoulder $Y^8$ engages the tip of a tooth $Z^3$. In such case, the lifting movement of the member Y does not begin until the end of the short period required for sufficient movement of the cam Z to permit the shoulder $Y^8$ to enter the space back of the tooth $Z^3$ initially engaged.

As shown, the member Y is formed with an opening $Y^7$ through which the shaft $Z^1$ passes and which is sufficiently large to provide clearance for the described movements of the member Y relative to the shaft $Z^1$.

The return of the member Y to its Fig. 4 position renders the part 45 operative on its next downstroke to advance shaft 34, thereby terminating the third stage of the operating cycle and initiating the first stage of the following operating cycle. The return of the member Y to its Fig. 4 position leaves the pin $Y^1$ in an intermediate portion of the length of the slot $Y^2$, as the member Y is then held above its lowermost position by the pin 34b which had turned the member Y into its Fig. 4A position. As the shaft 34 is angularly advanced thereafter, the movement of the pin last mentioned permits the member Y to descend into position for engagement by the following pin 34b, when the member Y is next to be advanced into its Fig. 4A position.

In the operation of the apparatus of Fig. 1 with control mechanism associated therewith as hereinbefore described, the supply of fuel of the spout burner $U^{13}$ is automatically controlled in accordance with the temperature of the molten glass about to be extruded. The type of control produced by us, namely, a stabilized follow-up control, is practically effective for its intended purpose of keeping the temperature of the glass in the spout suitably close to a desirable normal value of that temperature while avoiding rapid changes in that temperature. As previously explained, the effective length of stroke of the glass extruding plunger U may be varied as required to main the desirably constant glass gob weight. To this end, as diagrammatically shown in Fig. 1, we may provide gob weighing means in the form of a balance pivoted at $U^{14}$ and comprising a gob receiving platform $U^{13}$ beneath the plunger U and gob severing clipper means. When a glass gob is received on the platform $U^{13}$ of the balance, the weight of the gob is indicated on the scale $U^{15}$, and when the gob weight exceeds or falls below a predetermined value, the screw $U^{11}$ may be adjusted to shorten or lengthen, respectively, the stroke of the plunger U.

As shown in Fig. 1, the screw $U^{11}$ is manually adjusted, but means may be provided for automatically adjusting it as required to correct for variations in the weight of the gobs discharged from the desired or normal weight. One arrangement for so automatically adjusting the plunger stroke is diagrammatically illustrated in Fig. 2B. In automatically controlling the gob weight, it is in general immaterial whether the gob itself, or the bottle or other article produced from the gob is weighed as is provided for in Fig. 2B, except that it is not practically advantageous to weigh the gob prior to its conversion into the article formed. In Fig. 2B, UA represents a travelling conveyor receiving the gobs as they are formed and transmitting them into the article forming apparatus UB. The articles formed in that apparatus are moved away from the latter by a travelling conveyor UC which has its article carrying "run" passing over and supported by the platform UD' of a weighing scale UD. The weighing device UD includes a pointer $UD^2$ which is deflected into a position adjacent one or the other of two motor control contacts UE and UE' accordingly as the weight of the article above the platform UD' exceeds or is below the desired weight. Regardless of the deflected position of the pointer $UD^2$, the latter normally engages neither of the contacts UE and UE'. Periodically, however, the pointer $UD^2$ is engaged by a depressor $UD^3$ operated by a constantly running motor UF and thereby moved into engagement with one or the other of the two contacts, if the pointer is then deflected to the one or the other side of its normal weight position between the two contacts.

The engagement of the pointer $UD^2$ with the contact UE closes one of the two energizing circuits for a reversible motor UG which is thereby operated to rotate the screw U″ in the direction to shorten the stroke of the plunger U and decrease the weight of the gobs extruded. When the pointer $UD^2$ engages the contact $UE^1$, the second energizing circuit for the motor UG is closed and the motor then operates to adjust the screw U″ in the direction to lengthen the stroke of the plunger U and thereby increase the weight of the gobs discharged. As diagrammatically shown, the motor UG rotates the screw U″ by virtue of the fact that a gear $UG^1$ rotated by the motor is in mesh with a gear $U^{17}$ carried by the screw U″, one of the two gears being sufficiently elongated to preserve their operative relation, notwithstanding axial movement of the screw U″. Preferably, the periodicity or frequency of operation of the depressor $UD^3$ is sufficiently low relative to that of the plunger U, so that the effect of each operation of the motor UG and corresponding adjustment of the plunger U may manifest itself in the weight of the article above the platform $UD^1$ before a subsequent operation of the motor can occur, or a well known follow up device may be employed to affect a movement of contacts UE—$UE^1$ or pointer $UD^2$ in response to actuation of motor UG.

As will be apparent to those skilled in the art, the apparatus disclosed herein comprises features novel with us and useful for other purposes than the practice of the preferred method disclosed herein. In particular, it is to be noted that in the operation of glass gob forming apparatus of the general character disclosed herein but including no automatic control provisions, measuring and recording means capable of producing a record of the character illustrated in Fig. 11 are highly desirable. That record includes a sufficiently good and continuous record of the channel temperature, and its production requires only relatively brief, infrequent, and unobjectionable interruptions in the measurement and recording of the more important and critical spout temperature. Such a record of the two temperatures as is shown in Fig. 11, is of itself sufficient to provide a guide for a manual control of the gob and article forming devices more effective and resulting in better operative results than was heretofore practically obtainable.

The record curve shown in Fig. 11 is typical of the results obtained in the regular commercial use of the invention, in the form illustrated diagrammatically in Figs. 1 and 2, in an installation in which the conditions of operation are such that the normal spout temperature is substantially higher than the usual channel temperature, and in which the spout temperature departure from the predetermined normal spout temperature ordinarily does not exceed a couple of degrees or so, and in which the duration of each spout temperature control interval, represented by each curve section 26d—26b, is approximately ten minutes. In such use of the invention, as Fig. 11 indicates, several of said control intervals occur in regular operation between the instant at which the spout temperature begins to change in one direction, and the following instant at which the spout temperature begins to change in the opposite direction. During each control period in which the spout temperature is not at its normal value, a plurality of control adjustments of the burner U$^{13}$ are automatically effected in regular operation.

As those skilled in the art will understand, use of the invention is not restricted to installations in which the operating conditions are similar or even analogous to those just described, but our method of controlling the operation of a glass feeder is broadly characterized, in general, by the fact that it insures a slow swing, or reversal in the direction of change, of the spout temperature, so that ordinarily there is time for a considerable number of successive measurements of the spout temperature, and corresponding adjustments of the fuel supply to the burner U$^{13}$, during each interval in which the spout temperature is either continuously rising or continuously falling. This means, of course, that the tendency to a change in the spout temperature produced by each adjustment of the burner U$^{13}$ or other device employed to modify the spout temperature, must be sufficiently small so that ordinarily a considerable number of such adjustments are required to correct for such a small departure of the spout temperature from its normal value as one degree. Certain control system circuit arrangements disclosed but not claimed herein are claimed in the copending application of Anker E. Krogh, one of the joint applicants herein named, filed July 9, 1937, Serial No. 152,781.

While in accordance with the provisions of the statutes, I have illustrated and described the best forms of embodiment of my invention now known to me, it will be apparent to those skilled in the art that changes may be made in the forms of the apparatus and methods disclosed without departing from the spirit of my invention as set forth in the appended claims, and that in some cases certain features of my invention may be used to advantage without a corresponding use of other features.

Having now described our invention, what we claim as new and desire to secure by Letters Patent, is:

1. The combination with a glass feeder containing molten glass and devices separately responsive to temperatures in two portions of the receptacle the temperature in one of which portions is more important in the control of the feeder than the temperature in the other of said portions, a temperature measuring instrument, means for connecting said instrument alternately to said devices for periods which are longer in the case of the first mentioned device than in the case of the second mentioned device, feeder control means and means operated by said instrument to adjust said feeder control means in accordance with the measurements effected only during the longer periods.

2. The method of controlling the condition of molten glass in a glass feeder comprising a receptacle for the glass and heating means for supplying heat to the glass at a regulable rate, which consists in maintaining said rate at a constant value while the temperature of the glass is at a predetermined normal value, and rapidly changing said rate as the glass temperature changes from its said normal value in a direction to arrest and reverse the temperature change but to an extent insufficient to return said temperature to its normal value and reversely changing said rate rapidly as said temperature approaches its normal value, and further increasing or decreasing said rate more slowly when said temperature is respectively below or above its normal value until said temperature reaches said normal value.

3. Apparatus for controlling glass feeders comprising a receptacle for molten glass from which glass gobs are discharged, a reciprocating plunger having a predetermined stroke for extruding said gobs, and rotatable means for adjusting the stroke of said plunger, a reversable electrical motor connected to said rotatable means and operating to rotate said means in one direction or another to vary said stroke, means for measuring the weight of gobs discharged and means controlled by said measuring means to selectively energize said motor in one direction or the other to thereby minimize the gob weight variation from a predetermined normal weight.

4. Apparatus for controlling the condition of molten glass in a glass feeder comprising a receptacle for the glass and means controlling the temperature of said glass including in combination, heating means for supplying heat to the glass at a regulable rate, means responsive to the temperature of said glass, a pair of relatively movable control elements operatively associated with said temperature responsive means and relatively positioned thereby, a control member for said heating means operatively associated with said elements, and controlled thereby to adjust said member to predetermined positions corresponding to predetermined relative positions of said elements to effect a relatively rapid stabilized adjustment of the heat supplied by said glass heating means proportionately to a change in the temperature of the glass but independently of the relation between the existing value of the glass temperature and the desired value thereof, and means controlled by the temperature responsive means to effect a relatively slow adjustment of the heat supplied by said heating means to restore said desired temperature value on a variation of said glass temperature from said desired value.

5. Apparatus for controlling the condition of molten glass in a glass feeder comprising a receptacle for the glass and means controlling the temperature of said glass comprising in combination, heating means for supplying heat to the glass at a regulable rate, means responsive to the temperature of said glass, a pair of relatively movable control elements operatively associated with said temperature responsive means and relatively positioned thereby, a control member for said heating means, operatively associated with said elements and controlled thereby to adjust said member to predetermined positions corresponding to predetermined relative positions of said elements, to effect a relatively rapid stabilized adjustment of the heat supplied by said glass heating means proportionately to a change in the temperature of the glass but independently of the relation between the existing value of the glass temperature and the desired value thereof, and means controlled by the temperature responsive means to actuate said member to effect a relatively slow adjustment of the heat supplied by said heating means to restore said desired temperature value on a variation of said glass temperature from said desired value.

JOHN R. GREEN.
ANKER E. KROGH.
COLEMAN B. MOORE.
ROY ULLMAN.